US012672173B2

(12) United States Patent
Abotabl et al.

(10) Patent No.: US 12,672,173 B2
(45) Date of Patent: Jun. 30, 2026

(54) RANDOM ACCESS CHANNEL TRANSMISSION REPETITION IN FULL-DUPLEX COMMUNICATIONS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Hung Dinh Ly, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 655 days.

(21) Appl. No.: 18/150,014

(22) Filed: Jan. 4, 2023

(65) Prior Publication Data

US 2024/0224343 A1 Jul. 4, 2024

(51) Int. Cl.
| | |
|---|---|
| *H04W 52/00* | (2009.01) |
| *H04L 1/08* | (2006.01) |
| *H04L 5/14* | (2006.01) |
| *H04W 52/36* | (2009.01) |
| *H04W 74/0833* | (2024.01) |

(52) U.S. Cl.
CPC ........... *H04W 74/0841* (2013.01); *H04L 1/08* (2013.01); *H04L 5/14* (2013.01); *H04W 52/367* (2013.01)

(58) Field of Classification Search
None
See application file for complete search history.

(56) References Cited

U.S. PATENT DOCUMENTS

2022/0053566 A1 2/2022 Taherzadeh Boroujeni et al.

FOREIGN PATENT DOCUMENTS

WO WO2021092820 A1 * 5/2021 ............ H04W 74/08

OTHER PUBLICATIONS

International Search Report and Written Opinion—PCT/US2023/081379—ISA/EPO—Apr. 18, 2024.
Partial International Search Report—PCT/US2023/081379—ISA/EPO—Mar. 1, 2024.

(Continued)

*Primary Examiner* — Abdelillah Elmejjarmi
(74) *Attorney, Agent, or Firm* — Harrity & Harrity LLP

(57) ABSTRACT

Various aspects of the present disclosure generally relate to wireless communication. In some aspects, a user equipment (UE) may transmit, in a half-duplex slot and in accordance with a random access channel (RACH) transmission repetition scheme, a first quantity of RACH transmissions. The UE may transmit, in accordance with the RACH transmission repetition scheme and in a full-duplex slot associated with a subband full-duplex (SBFD) configuration, a second quantity of RACH transmissions, the first quantity and the second quantity being based on a half-duplex slot type and a full-duplex slot type, respectively. Numerous other aspects are described.

30 Claims, 17 Drawing Sheets

(56)               References Cited

OTHER PUBLICATIONS

Qualcomm Incorporated: "Feasibility and Techniques for Subband Non-overlapping Full Duplex", 3GPP TSG RAN WG1, Meeting #110bis-e, R1-2209983, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, XP052259454, 37 Pages, paragraph [02.2] paragraph [02.5].

Qualcomm Incorporated: "Feasibility and Techniques for Subband Non-overlapping Full Duplex", 3GPP TSG RAN WG1, Meeting #110bis-e, R1-2209983, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, XP052259454, 37 Pages, paragraph [2.2.4] paragraph [02.5] paragraph [0008].

* cited by examiner

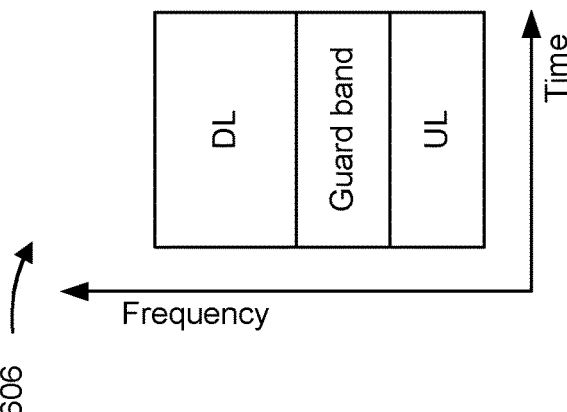
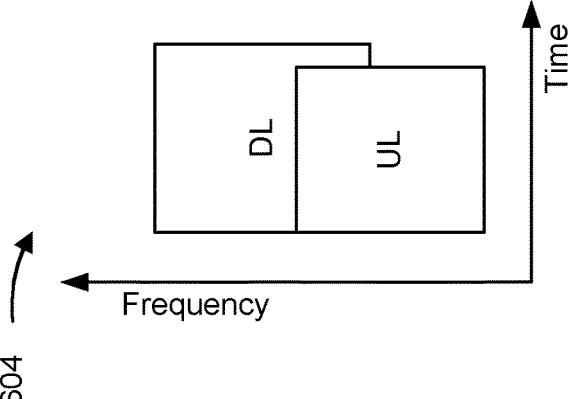
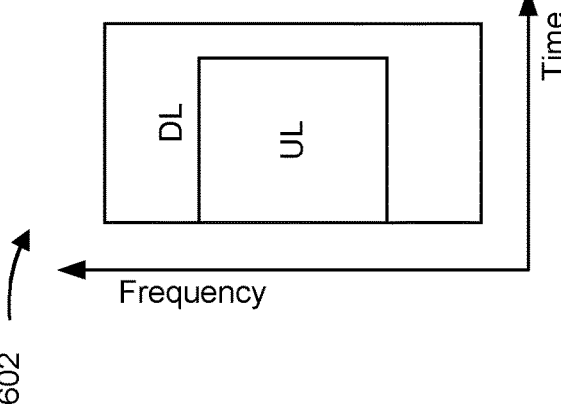
FIG. 6

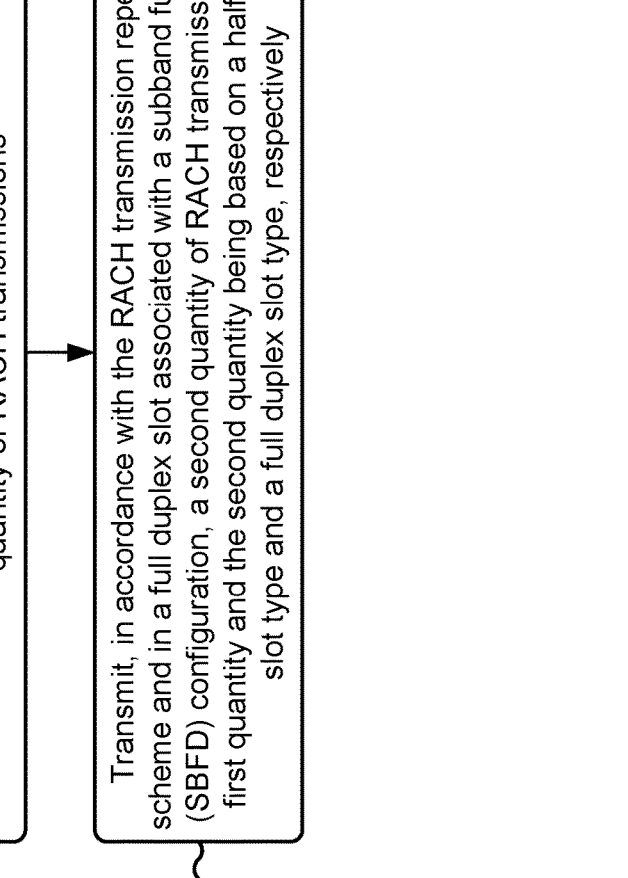

Transmit, in a half duplex slot and in accordance with a random access channel (RACH) transmission repetition scheme, a first quantity of RACH transmissions

1010

Transmit, in accordance with the RACH transmission repetition scheme and in a full duplex slot associated with a subband full duplex (SBFD) configuration, a second quantity of RACH transmissions, the first quantity and the second quantity being based on a half duplex slot type and a full duplex slot type, respectively

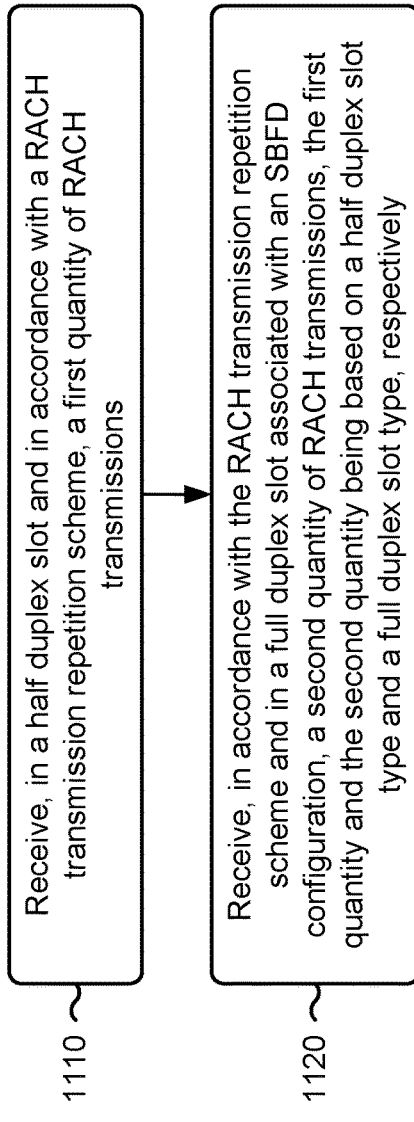

1110 Receive, in a half duplex slot and in accordance with a RACH transmission repetition scheme, a first quantity of RACH transmissions 1120 Receive, in accordance with the RACH transmission repetition scheme and in a full duplex slot associated with an SBFD configuration, a second quantity of RACH transmissions, the first quantity and the second quantity being based on a half duplex slot type and a full duplex slot type, respectively

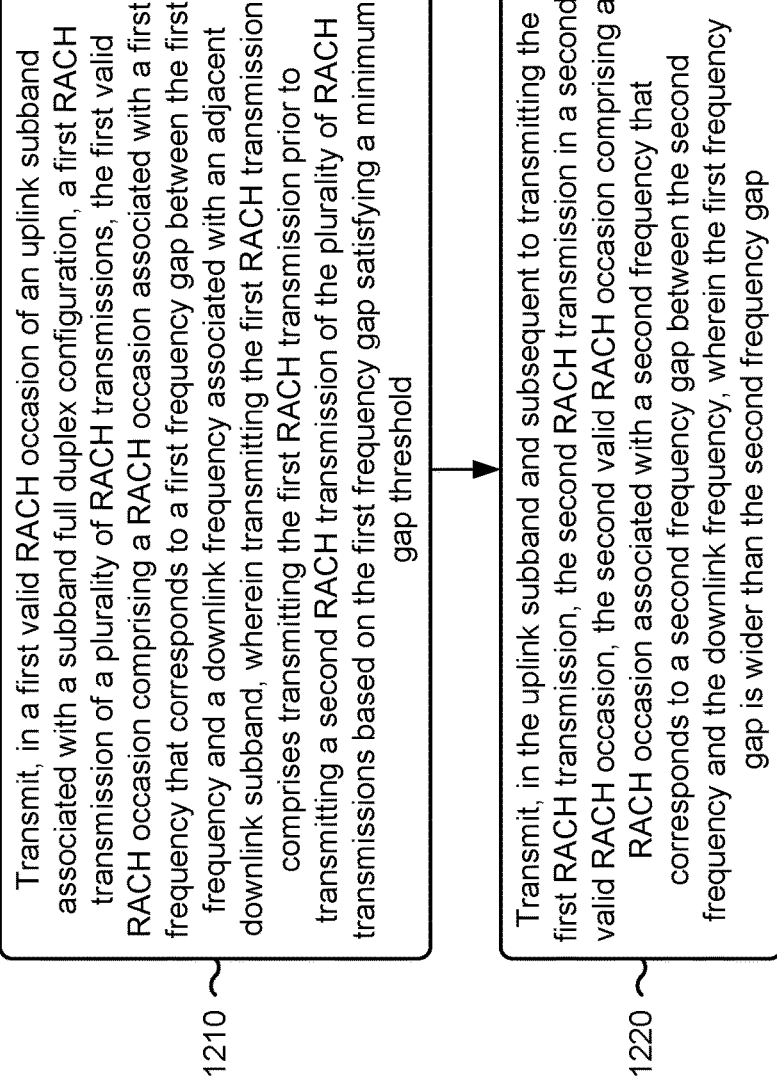

1210 Transmit, in a first valid RACH occasion of an uplink subband associated with a subband full duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the plurality of RACH transmissions based on the first frequency gap satisfying a minimum gap threshold 1220 Transmit, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap

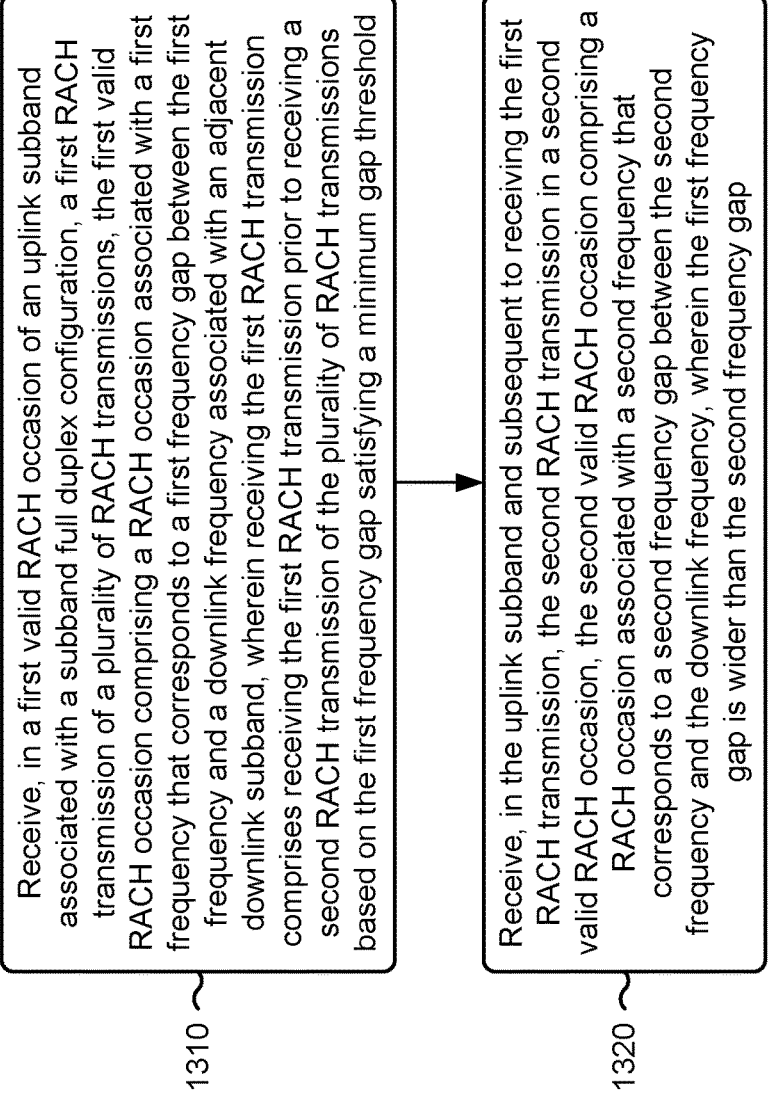

Receive, in a first valid RACH occasion of an uplink subband associated with a subband full duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the plurality of RACH transmissions based on the first frequency gap satisfying a minimum gap threshold

1310

Receive, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap

RANDOM ACCESS CHANNEL TRANSMISSION REPETITION IN FULL-DUPLEX COMMUNICATIONS

FIELD OF THE DISCLOSURE

Aspects of the present disclosure generally relate to wireless communication and to techniques and apparatuses for random access channel transmission repetition in full-duplex communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating examples of full-duplex communication, in accordance with the present disclosure.

FIG. 10 is a diagram illustrating an example process performed, for example, by a UE, in accordance with the present disclosure.

FIG. 11 is a diagram illustrating an example process performed, for example, by a network node, in accordance with the present disclosure.

FIG. 12 is a diagram illustrating an example process performed, for example, by a UE, in accordance with the present disclosure.

FIG. 13 is a diagram illustrating an example process performed, for example, by a network node, in accordance with the present disclosure.

SUMMARY

Figure 1:
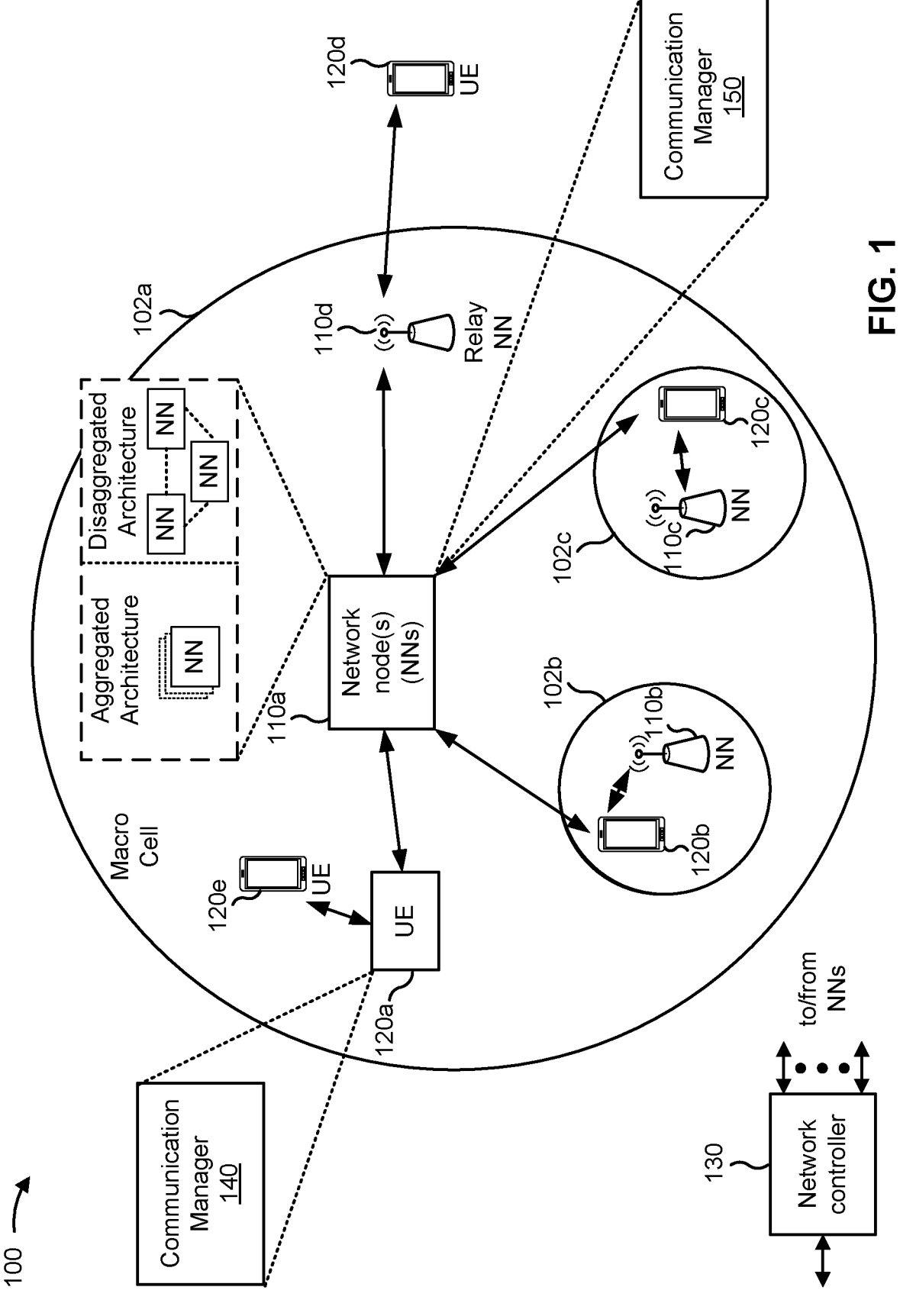
FIG. 1 is a diagram illustrating an example of a wireless network, in accordance with the present disclosure.

Some aspects described herein relate to an apparatus for wireless communication at a user equipment (UE). The apparatus may include a memory and one or more processors coupled to the memory. The one or more processors may be configured to transmit, in a half-duplex slot and in accordance with a random access channel (RACH) transmission repetition scheme, a first quantity of RACH transmissions. The one or more processors may be configured to transmit, in accordance with the RACH transmission repetition scheme and in a full-duplex slot associated with a subband full-duplex (SBFD) configuration, a second quantity of RACH transmissions, the first quantity and the second quantity being based on a half-duplex slot type and a full-duplex slot type, respectively.

Some aspects described herein relate to an apparatus for wireless communication at a network node. The apparatus may include a memory and one or more processors coupled to the memory. The one or more processors may be configured to receive, in a half-duplex slot and in accordance with a RACH transmission repetition scheme, a first quantity of RACH transmissions. The one or more processors may be configured to receive, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively.

Some aspects described herein relate to an apparatus for wireless communication at a UE. The apparatus may include a memory and one or more processors coupled to the memory. The one or more processors may be configured to transmit, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the plurality of RACH transmissions based on the first frequency gap satisfying a minimum gap threshold. The one or more processors may be configured to transmit, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

Some aspects described herein relate to an apparatus for wireless communication at a network node. The apparatus may include a memory and one or more processors coupled to the memory. The one or more processors may be configured to receive, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the plurality of RACH transmissions based on the first frequency gap satisfying a minimum gap threshold. The one or more processors may be configured to receive, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

Some aspects described herein relate to a method of wireless communication performed by a UE. The method may include transmitting, in a half-duplex slot and in accordance with a RACH transmission repetition scheme, a first quantity of RACH transmissions. The method may include transmitting, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively.

Some aspects described herein relate to a method of wireless communication performed by a network node. The method may include receiving, in a half-duplex slot and in accordance with a RACH transmission repetition scheme, a first quantity of RACH transmissions. The method may include receiving, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively.

Some aspects described herein relate to a method of wireless communication performed by a UE. The method may include transmitting, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the plurality of RACH transmissions based on the first frequency gap satisfying a minimum gap threshold. The method may include transmitting, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

Some aspects described herein relate to a method of wireless communication performed by a network node. The method may include receiving, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the plurality of RACH transmissions based on the first frequency gap satisfying a minimum gap threshold. The method may include receiving, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

Some aspects described herein relate to a non-transitory computer-readable medium that stores a set of instructions for wireless communication by a UE. The set of instructions, when executed by one or more processors of the UE, may cause the UE to transmit, in a half-duplex slot and in accordance with a RACH transmission repetition scheme, a first quantity of RACH transmissions. The set of instructions, when executed by one or more processors of the UE, may cause the UE to transmit, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively.

Some aspects described herein relate to a non-transitory computer-readable medium that stores a set of instructions for wireless communication by a network node. The set of instructions, when executed by one or more processors of the network node, may cause the network node to receive, in a half-duplex slot and in accordance with a RACH transmission repetition scheme, a first quantity of RACH transmissions. The set of instructions, when executed by one or more processors of the network node, may cause the network node to receive, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively.

Some aspects described herein relate to a non-transitory computer-readable medium that stores a set of instructions for wireless communication by a UE. The set of instructions, when executed by one or more processors of the UE, may cause the UE to transmit, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the plurality of RACH transmissions based on the first frequency gap satisfying a minimum gap threshold. The set of instructions, when executed by one or more processors of the UE, may cause the UE to transmit, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

Some aspects described herein relate to a non-transitory computer-readable medium that stores a set of instructions for wireless communication by a network node. The set of instructions, when executed by one or more processors of the network node, may cause the network node to receive, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the plurality of RACH transmissions based on the first frequency gap satisfying a minimum gap threshold. The set of instructions, when executed by one or more processors of the network node, may cause the network node to receive, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

Some aspects described herein relate to an apparatus for wireless communication. The apparatus may include means for transmitting, in a half-duplex slot and in accordance with a RACH transmission repetition scheme, a first quantity of RACH transmissions. The apparatus may include means for transmitting, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively.

Some aspects described herein relate to an apparatus for wireless communication. The apparatus may include means for receiving, in a half-duplex slot and in accordance with a RACH transmission repetition scheme, a first quantity of RACH transmissions. The apparatus may include means for receiving, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively.

Some aspects described herein relate to an apparatus for wireless communication. The apparatus may include means for transmitting, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the plurality of RACH transmissions based on the first frequency gap satisfying a minimum gap threshold. The apparatus may include means for transmitting, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

Some aspects described herein relate to an apparatus for wireless communication. The apparatus may include means for receiving, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the plurality of RACH transmissions based on the first frequency gap satisfying a minimum gap threshold. The apparatus may include means for receiving, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, in a half-duplex slot and in accordance with a random access channel (RACH) transmission repetition scheme, a first quantity of RACH transmissions; and transmit, in accordance with the RACH transmission repetition scheme and in a full-duplex slot associated with a subband full-duplex (SBFD) configuration, a second quantity of RACH transmissions, the first quantity and the second quantity being based on a half-duplex slot type and a full-duplex slot type, respectively.

In some aspects, the communication manager 140 may transmit, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the plurality of RACH transmissions based on the first frequency gap satisfying a minimum gap threshold; and transmit, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap. Additionally, or alternatively, the communication manager 140 may perform one or more other operations described herein.

In some aspects, the network node 110 may include a communication manager 150. As described in more detail elsewhere herein, the communication manager 150 may receive, in a half-duplex slot and in accordance with a RACH transmission repetition scheme, a first quantity of RACH transmissions; and receive, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively.

In some aspects, the communication manager 150 may receive, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the plurality of RACH transmissions based on the first frequency gap satisfying a minimum gap threshold; and receive, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap. Additionally, or alternatively, the communication manager 150 may perform one or more other operations described herein.

As indicated above, FIG. 1 is provided as an example. Other examples may differ from what is described with regard to FIG. 1.

Figure 2:
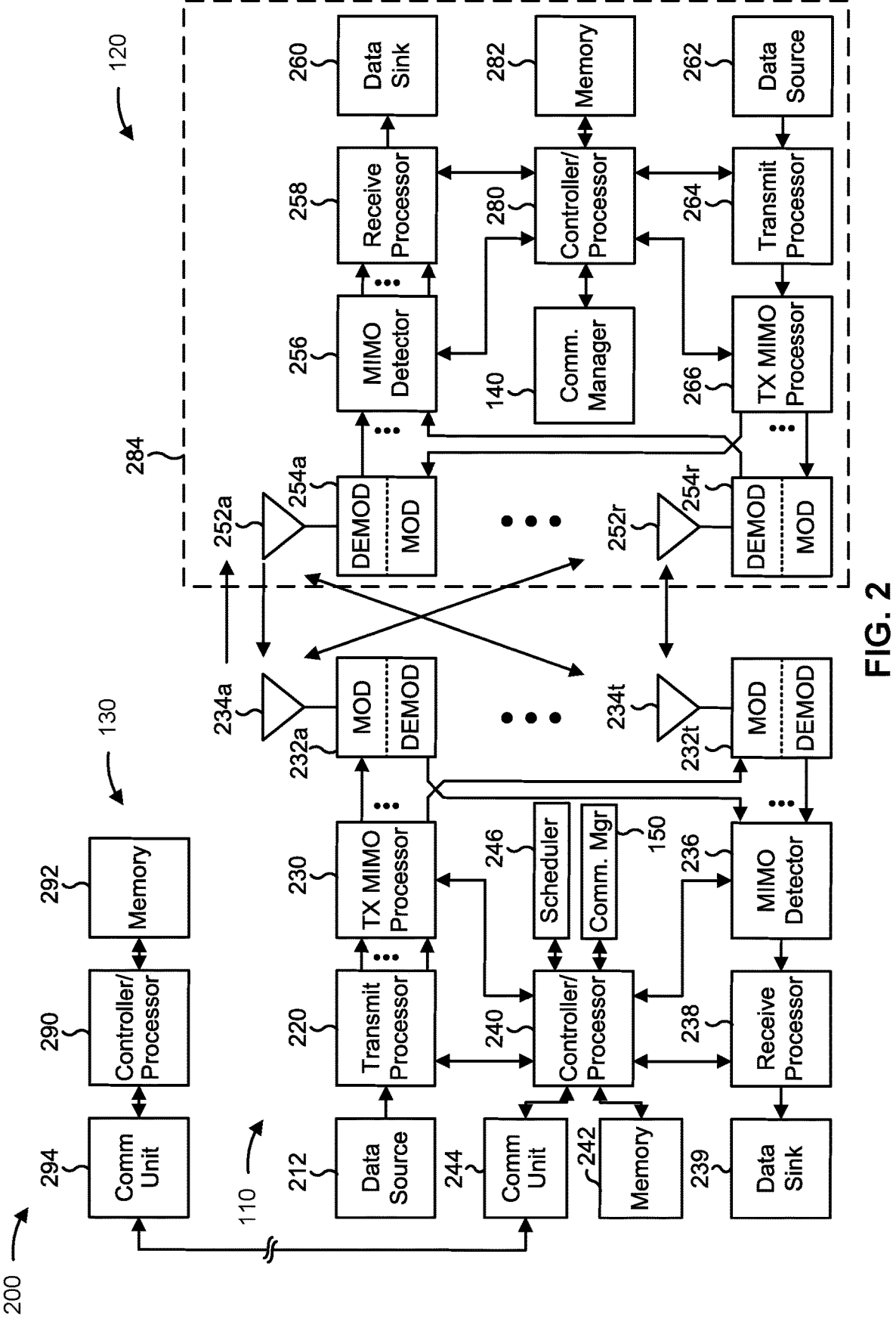
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-15).

The controller/processor 240 of the network node 110, the controller/processor 280 of the UE 120, and/or any other component(s) of FIG. 2 may perform one or more techniques associated with RACH transmission repetition in full-duplex communications, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a UE (e.g., the UE 120) includes means for transmitting, in a half-duplex slot and in accordance with a RACH transmission repetition scheme, a first quantity of RACH transmissions; and/or means for transmitting, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., the UE 120) includes means for transmitting, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the plurality of RACH transmissions based on the first frequency gap satisfying a minimum gap threshold; and/or means for transmitting, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for receiving, in a half-duplex slot and in accordance with a RACH transmission repetition scheme, a first quantity of RACH transmissions; and/or means for receiving, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a network node (e.g., the network node 110) includes means for receiving, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the plurality of RACH transmissions based on the first frequency gap satisfying a minimum gap threshold; and/or means for receiving, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
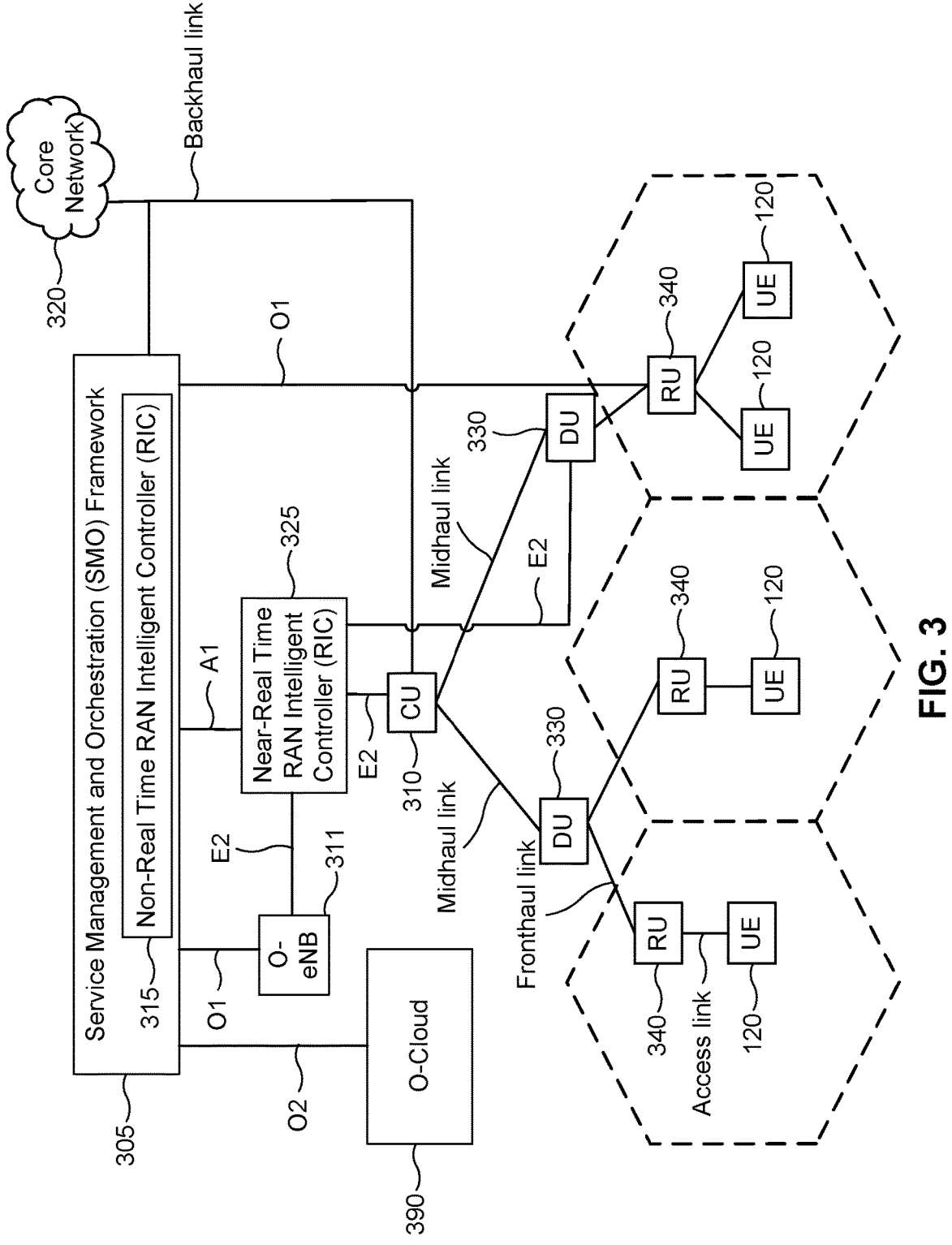
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces.

Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4B:
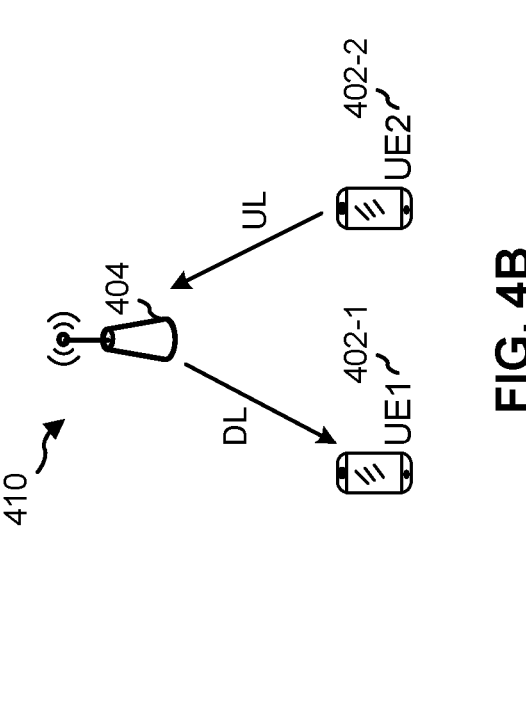
FIGS. 4A-4C are diagrams illustrating examples of full-duplex communication in accordance with the present disclosure.
Figure 4C:
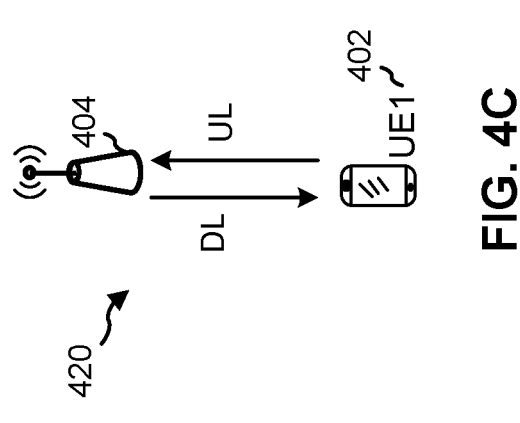
Figure 4A:
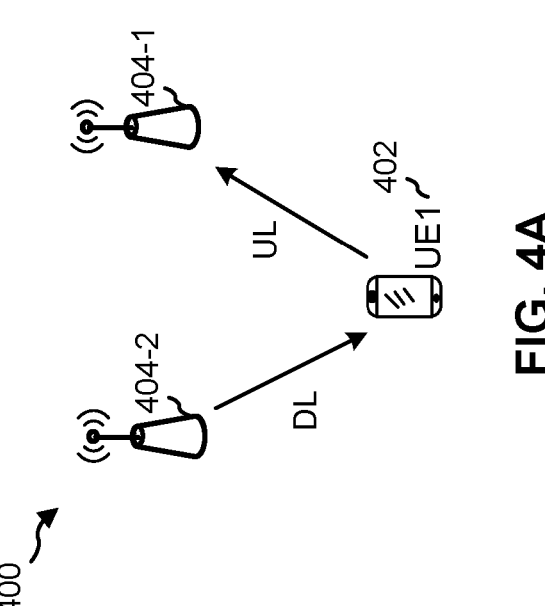

FIGS. 4A-4C are diagrams illustrating examples of FD communication in accordance with the present disclosure. A first full-duplex scenario 400 depicted in FIG. 4A includes a UE1 402 and two network nodes (e.g., base stations or TRPs) 404-1, 404-2, where the UE1 402 is sending uplink transmissions to network node 404-1 and is receiving downlink transmissions from network node 404-2. In the first full-duplex scenario 400 of FIG. 4A, FD is enabled for the UE1 402, but not for the network node 404-1, 404-2. A second full-duplex scenario 410 depicted in FIG. 4B includes two UEs, shown as UE1 402-1 and UE2 402-2, and a network node 404, where the UE1 402-1 is receiving a downlink transmission from the network node 404 and the UE2 402-2 is transmitting an uplink transmission to the network node 404. In the second full-duplex scenario 410, FD is enabled for the network node 404, but not for UE1 402-1 and UE2 402-2. A third full-duplex scenario 420 is depicted in FIG. 4C that includes a UE1 402 and a network node 404, where the UE1 402 is receiving a downlink transmission from the network node 404 and the UE1 402 is transmitting an uplink transmission to the network node 404. In the third full-duplex scenario 420, FD is enabled for both the UE1 402 and the network node 404.

As indicated above, FIGS. 4A-4C provide some examples. Other examples may differ from what is described with regard to FIGS. 4A-4C.

Figure 5:
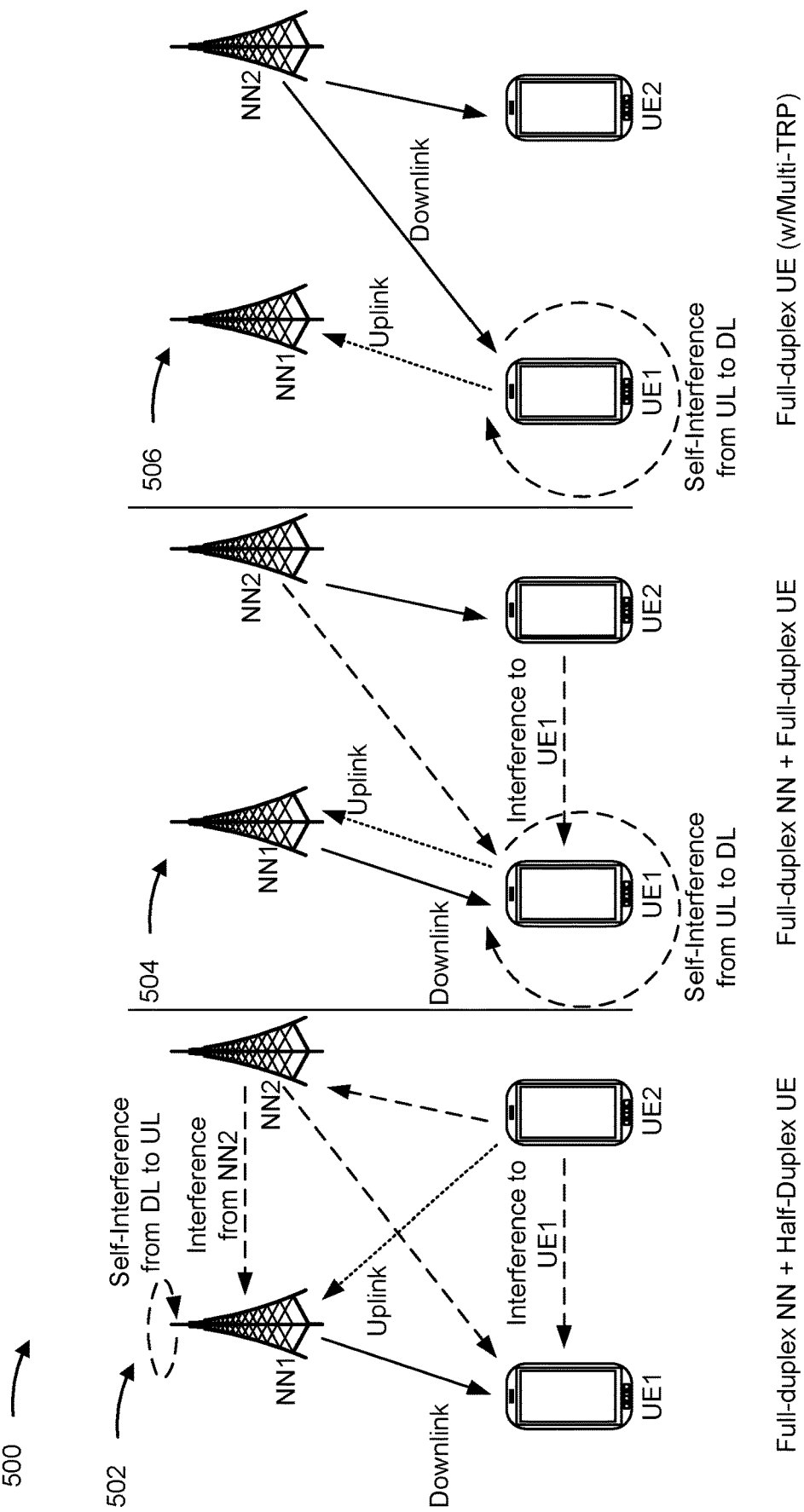
FIG. 5 is a diagram illustrating an example of full-duplex communication modes, in accordance with the present disclosure.

FIG. 5 is a diagram illustrating an example of full-duplex communication modes 500, in accordance with the present disclosure. In a first mode 502, a first network node (shown as NN1) and a second network node (shown as NN2) may be full-duplex devices (e.g., may be capable of communicating in a full-duplex manner). A first UE and a second UE may be half-duplex UEs (e.g., may not be capable of communicating in a full-duplex manner). The first network node may perform downlink transmissions to the first UE, and the first network node may receive uplink transmissions from the second UE. The first network node may experience self-interference (SI) from a downlink to an uplink based at least in part on the downlink transmissions to the first UE and the uplink transmissions received from the second UE. The first network node may experience interference from the second network node. The first UE may experience cross-link interference (CLI) from the second network node and the second UE.

In a second mode 504, a first network node and a second network node may be full-duplex devices. A first UE and a second UE may be full-duplex UEs. The first network node may perform downlink transmissions to the first UE, and the first network node may receive uplink transmissions from the first UE. The first UE may experience SI from an uplink to a downlink based at least in part on the downlink transmissions from the first network node and the uplink transmissions to the first network node. The first UE may experience CLI from the second network node and the second UE.

In a third mode 506, a first UE and a second UE may be full-duplex UEs and may communicate in a multiple TRP configuration. A first network node may receive uplink transmissions from the first UE, and a second network node may perform downlink transmissions to the first UE and the second UE. The first UE may experience SI from an uplink to a downlink based at least in part on the uplink transmissions to the first network node and the downlink transmissions from the second network node.

As indicated above, FIG. 5 is provided as an example. Other examples may differ from what is described with regard to FIG. 5.

FIG. 6 is a diagram illustrating examples of full-duplex communication 600, in accordance with the present disclosure. In some cases, a wireless communication device (such as a UE or a network node) may support full-duplex operations. Full-duplex operations may include the wireless communication device transmitting and receiving at approximately the same time.

A UE may operate in an in-band full-duplex mode. In the in-band full-duplex mode, the UE may transmit and receive on a same time and frequency resource. An uplink and a downlink may share the same time and frequency resource. For example, in a first full-duplex communication 602, a time and frequency resource for the uplink may fully overlap with a time and frequency resource for the downlink. As another example, in a second full-duplex communication 604, a time and frequency resource for the uplink may partially overlap with a time and frequency resource for the downlink.

Full-duplex operations may include an SBFD mode. The SBFD mode may also be referred to as a subband frequency division duplex mode or a flexible duplex mode. SBFD communication 606 shows that the wireless communication device may transmit and receive at a same time (in the same SBFD slot), but the wireless communication device may transmit and receive on different frequency domain resources. For example, a network node may be operating in an SBFD mode. The network node may schedule a first UE to receive a downlink communication in an SBFD slot. The network node may schedule a second UE to transmit an uplink communication in the same SBFD slot. However, the uplink communication may cause interference for the first UE that is receiving the downlink communication. To address this, a downlink time/frequency resource in the SBFD slot may be separated (e.g., in time or frequency) from an uplink time/frequency resource in the SBFD slot by a gap, which may function to reduce self-interference and improve latency and uplink coverage. The gap may be a frequency offset or a frequency gap (guard band) between downlink time/frequency resources and uplink time/frequency resources in the same SBFD slot.

In some cases, a slot pattern may include a combination of downlink slots, uplink slots, or SBFD slots.

As indicated above, FIG. 6 is provided as an example. Other examples may differ from what is described with regard to FIG. 6.

Figure 7A:
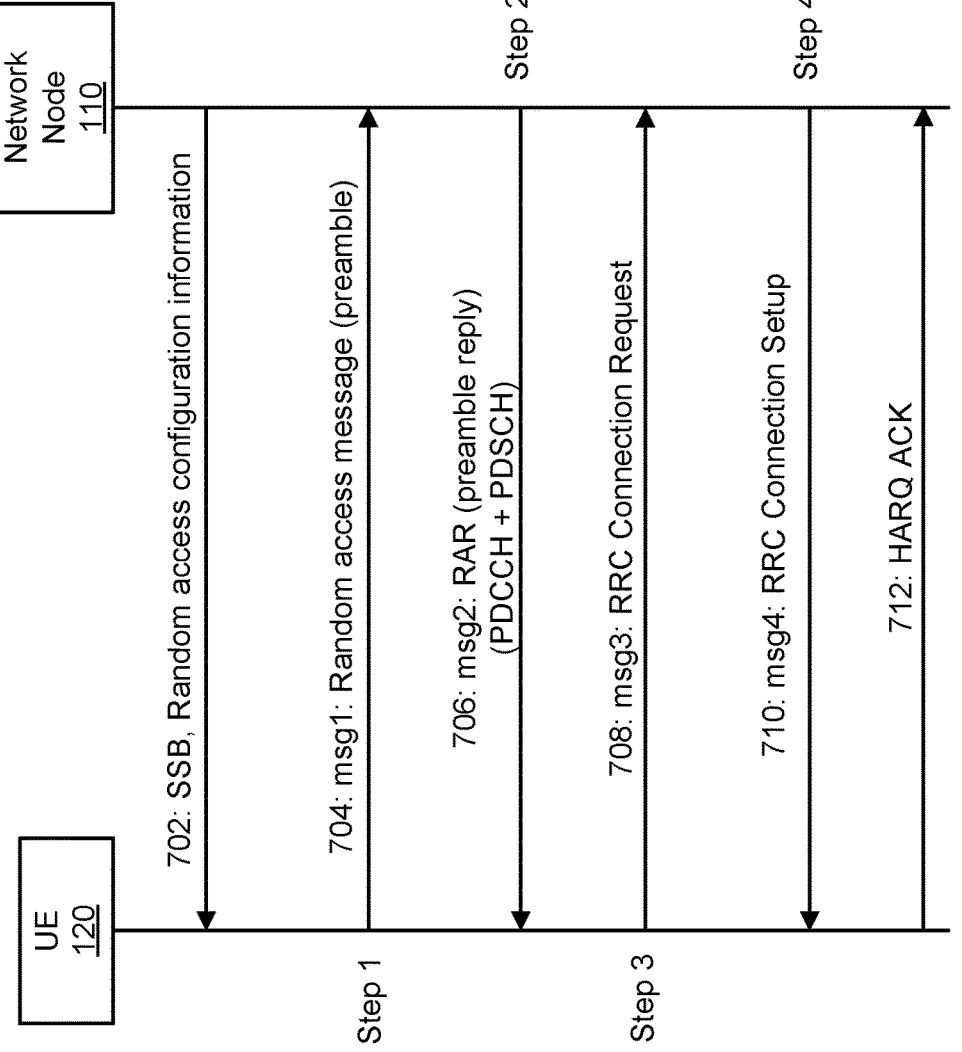
FIG. 7A is a diagram illustrating an example of a four-step random access procedure, in accordance with the present disclosure.

FIG. 7A is a diagram illustrating an example 700 of a four-step random access procedure, in accordance with the present disclosure. As shown in FIG. 7A, a network node 110 and a UE 120 may communicate with one another to perform the four-step random access procedure (which may be referred to as a "Type-1 random access procedure").

As shown by reference number 702, the network node 110 may transmit, and the UE 120 may receive, one or more SSBs and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a random access message (RAM) and/or one or more parameters for receiving a random access response (RAR).

As shown by reference number 704, the UE 120 may transmit a RAM, which may include a preamble (sometimes referred to as a random access preamble, a physical RACH (PRACH) preamble, or a RAM preamble). The message that includes the preamble may be referred to as a message 1, msg1, MSG1, a first message, a RACH transmission, a PRACH transmission, or an initial message in a four-step random access procedure. The random access message may include a random access preamble identifier.

As shown by reference number 706, the network node 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the network node 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also, as part of the second step of the four-step random access procedure, the network node 110 may transmit the PDSCH communication for the RAR, as scheduled by the PDCCH communication. The RAR may be included in a medium access control (MAC) protocol data unit (PDU) of the PDSCH communication.

As shown by reference number 708, the UE 120 may transmit an RRC connection request message. The RRC connection request message may be referred to as message 3, msg3, MSG3, or a third message of a four-step random access procedure. In some aspects, the RRC connection request may include a UE identifier, uplink control information (UCI), and/or a physical uplink shared channel (PUSCH) communication (e.g., an RRC connection request).

As shown by reference number 710, the network node 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 712, if the UE 120 successfully receives the RRC connection setup message, the UE 120 may transmit a hybrid automatic repeat request (HARQ) acknowledgement (ACK).

As indicated above, FIG. 7A is provided as an example. Other examples may differ from what is described with regard to FIG. 7A. In some aspects, other examples may use a two-step random access procedure.

Figure 7B:
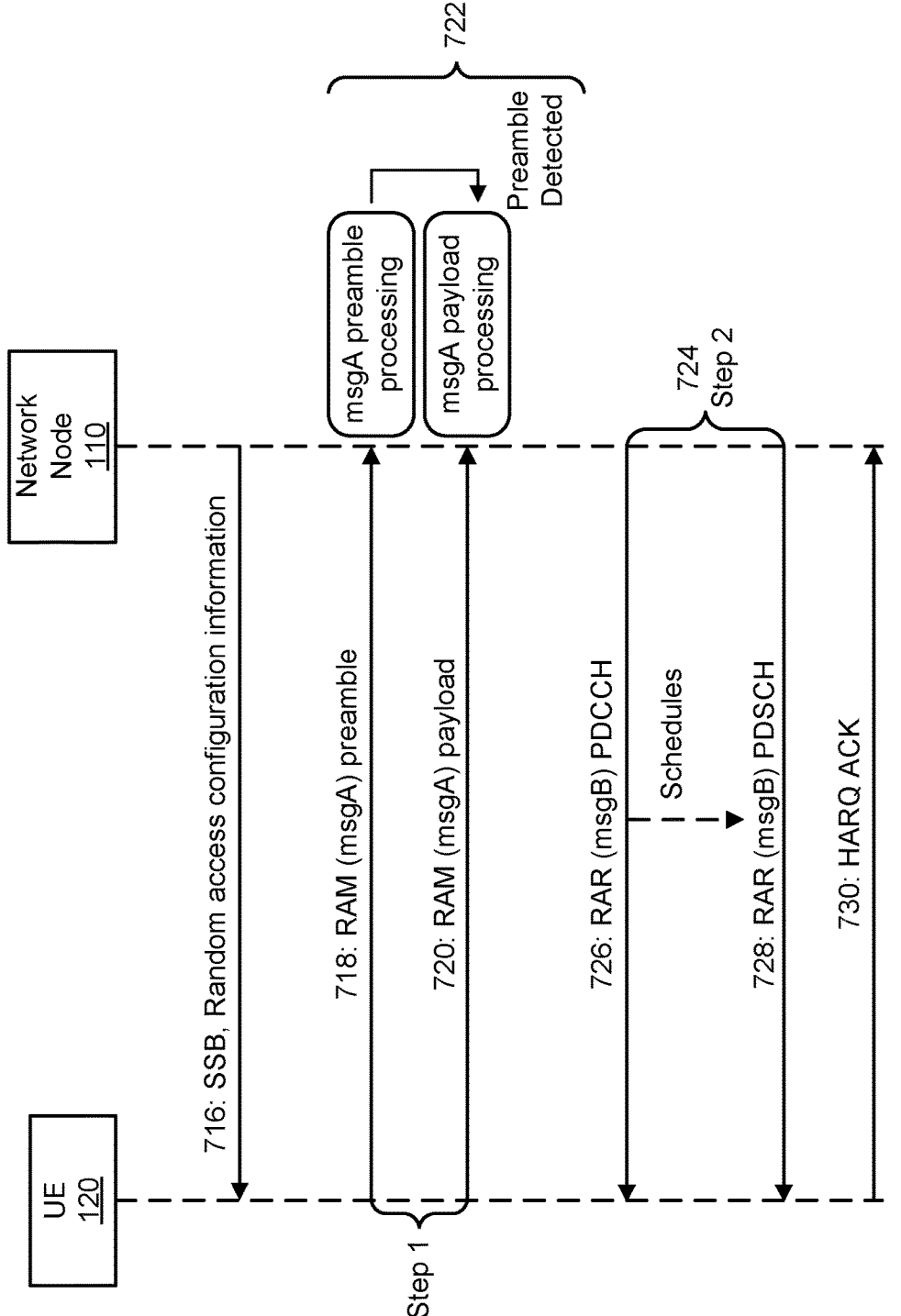
FIG. 7B is a diagram illustrating an example of a two-step random access procedure, in accordance with the present disclosure.

FIG. 7B is a diagram illustrating an example 714 of a two-step random access procedure, in accordance with the present disclosure. As shown in FIG. 4, a network node 110 and a UE 120 may communicate with one another to perform the two-step random access procedure (which may be referred to as a "Type-2 random access procedure").

As shown by reference number 716, the network node 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the two-step random access procedure, such as one or more parameters for transmitting a RAM, and/or a RAR to the RAM.

As shown by reference number 718, the UE 120 may transmit, and the network node 110 may receive, a RAM preamble. As shown by reference number 720, the UE 120 may transmit, and the network node 110 may receive, a RAM payload. As shown, the UE 120 may transmit the RAM preamble and the RAM payload to the network node 110 as part of an initial (or first) step of the two-step random access procedure. In some aspects, the RAM may be referred to as message A, msgA, a first message, and/or an initial message in a two-step random access procedure. Furthermore, in some aspects, the RAM preamble may be referred to as a message A preamble, a msgA preamble, a preamble, and/or a physical random access channel (PRACH) preamble, and the RAM payload may be referred to as a message A payload, a msgA payload, and/or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a PUSCH transmission).

As shown by reference number 722, the network node 110 may receive the RAM preamble transmitted by the UE 120. If the network node 110 successfully receives and decodes the RAM preamble, the network node 110 may then receive and decode the RAM payload.

As shown by reference number 724, the network node 110 may transmit an RAR (sometimes referred to as an RAR message). As shown, the network node 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 726, as part of the second step of the two-step random access procedure, the network node 110 may transmit a PDCCH communication for the RAR. The PDCCH communication may schedule a PDSCH communication that includes the RAR. For example, the PDCCH communication may indicate a resource allocation (e.g., in downlink control information (DCI)) for the PDSCH communication.

As shown by reference number 728, as part of the second step of the two-step random access procedure, the network node 110 may transmit the PDSCH communication for the RAR, as scheduled by the PDCCH communication. The RAR may be included in an MAC PDU of the PDSCH communication. As shown by reference number 730, if the UE 120 successfully receives the RAR, the UE 120 may transmit a HARQ ACK.

As indicated above, FIG. 7B is provided as an example. Other examples may differ from what is described with regard to FIG. 7B.

Figure 8A:
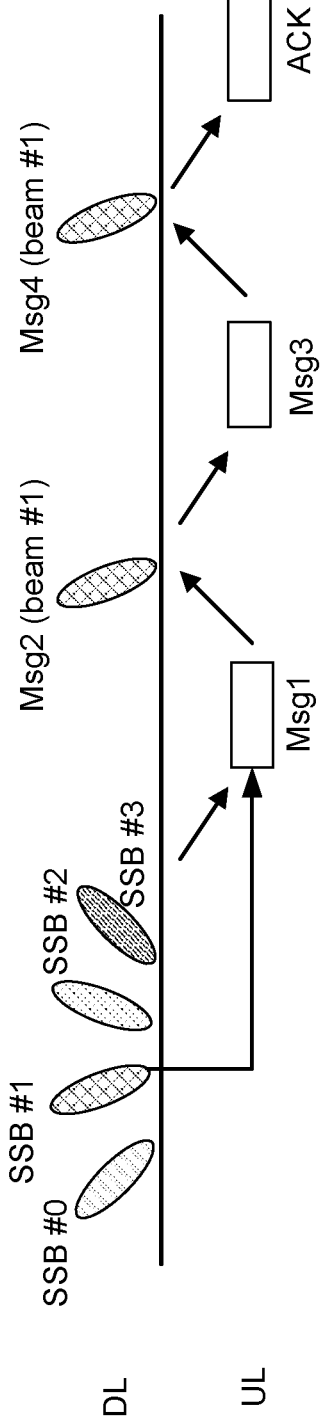
FIG. 8A is a diagram illustrating an example of a random access channel (RACH) procedure with multi-beam synchronization signal block (SSB), in accordance with the present disclosure.

FIG. 8A is a diagram illustrating an example 800 of a RACH procedure with multi-beam SSB, in accordance with the present disclosure.

During a RACH procedure between a UE and a network node, the UE may perform a RACH transmission with the network node. The RACH transmission may be associated with a Msg-1 when the RACH procedure between the UE and the network node is a 4-step PRACH procedure. Alternatively, the RACH transmission may be associated with a Msg-A when the RACH procedure between the UE and the network node is a 2-step PRACH procedure. The UE may receive a system information block (SIB) that configures an SSB to RACH occasion (SSB-RO) mapping for the UE. The SSB-RO mapping (which also may be referred to as an "SSB-RO association") may be a one-to-one mapping between an SSB and RACH resources. The SSB may also be referred to herein as an SSB beam. The RACH resources may be defined in a time domain and in a frequency domain.

For example, for a Type-1 random access procedure, a UE can be provided a number N of SSB indexes per RACH occasion and a number R of contention based preambles per SSB block index per valid RACH occasion by a parameter ssb-perRACH-OccasionAndCB-PreamblesPerSSB. The number N of SSB indexes associated with one RACH occasion may include a fractional value or an integer value. For example, N=⅛ indicates that there is one SSB index associated with 8 RACH occasions, N=¼ indicates that there is one SSB index associated with 8 RACH occasions, N=1 indicates that there is one SSB index associated with one RACH occasion, and so on. For a Type-1 random access procedure, or for a Type-2 random access procedure with separate configuration of RACH occasions from a Type 1 random access procedure, if N<1, one SSB index can be mapped to 1/N consecutive valid RACH occasions and R contention based preambles with consecutive indexes can be associated with the SSB index per valid RACH occasion start from preamble index 0. If N≥1, R contention based preambles with consecutive indexes associated with SSB index n, 0≤n≤N−1, per valid RACH occasion start from preamble index n·

$$N_{preamble}^{total} \big/ N, \text{ where } N_{preamble}^{total} \big/ N$$

can be provided by a parameter totalNumberOfRA-Preambles.

In some cases, the SSBs can be associated with RACH occasions within association periods. For example, an association period, starting from a frame 0, can be a smallest value in a set determined by the RACH configuration period such that $$N_{Tx}^{SSB}$$

SSBs are mapped at least once to the RACH occasions within the association period, where a UE can obtain $$N_{Tx}^{SSB}$$

from a value indicated in a SIB1 or in a serving cell common configuration. An association pattern can include one or more association periods and can be determined so that a pattern between RACH occasions and SSBs repeats at most every 160 milliseconds.

The UE may perform the RACH transmission for a multi-beam SSB received from the network node. For example, the UE may receive a plurality of SSBs from the network node. The UE may measure a power level associated with each of the plurality of SSBs received from the network node. The measured power level may be an RSRP measurement. The UE may select an SSB (e.g., SSB #1, as shown) from the plurality of SSBs based at least in part on a measured power level for each of the plurality of SSBs. The UE may compare the measured power level for each of the plurality of SSBs to a configured threshold. The configured threshold may be included in the SIB received at the UE. When measured power levels of one or more SSBs satisfy the configured threshold (e.g., an RSRP measurement for the one or more SSBs is greater than the configured threshold), the UE may select an SSB (e.g., SSB #1) from the one or more SSBs. When measured power levels for each of the plurality of SSBs do not satisfy the configured threshold (e.g., RSRP measurements for the SSBs are less than the configured threshold), the UE may select an SSB from the plurality of SSBs. The UE may select the SSB from the plurality of SSBs based at least in part on the measured power levels associated with the plurality of SSBs. The UE may select a RACH resource associated with the SSB. The UE may perform the RACH transmission (shown as "Msg1") using the PRACH resource associated with the SSB. The UE transmit the RACH transmission using a spatial filter associated with the chosen SSB (SSB #1).

If the RACH transmission is received by the network node, the network node will use the same beam (shown as "beam #1") for the transmission of Msg-2 PDCCH/PDSCH and Msg-4 PDCCH/PDSCH, as shown. The UE transmits Msg3 PUSCH using the same spatial filter that the UE uses to transmit the Msg1.

As indicated above, FIG. 8A is provided as an example. Other examples may differ from what is described with regard to FIG. 8A.

Figure 8B:
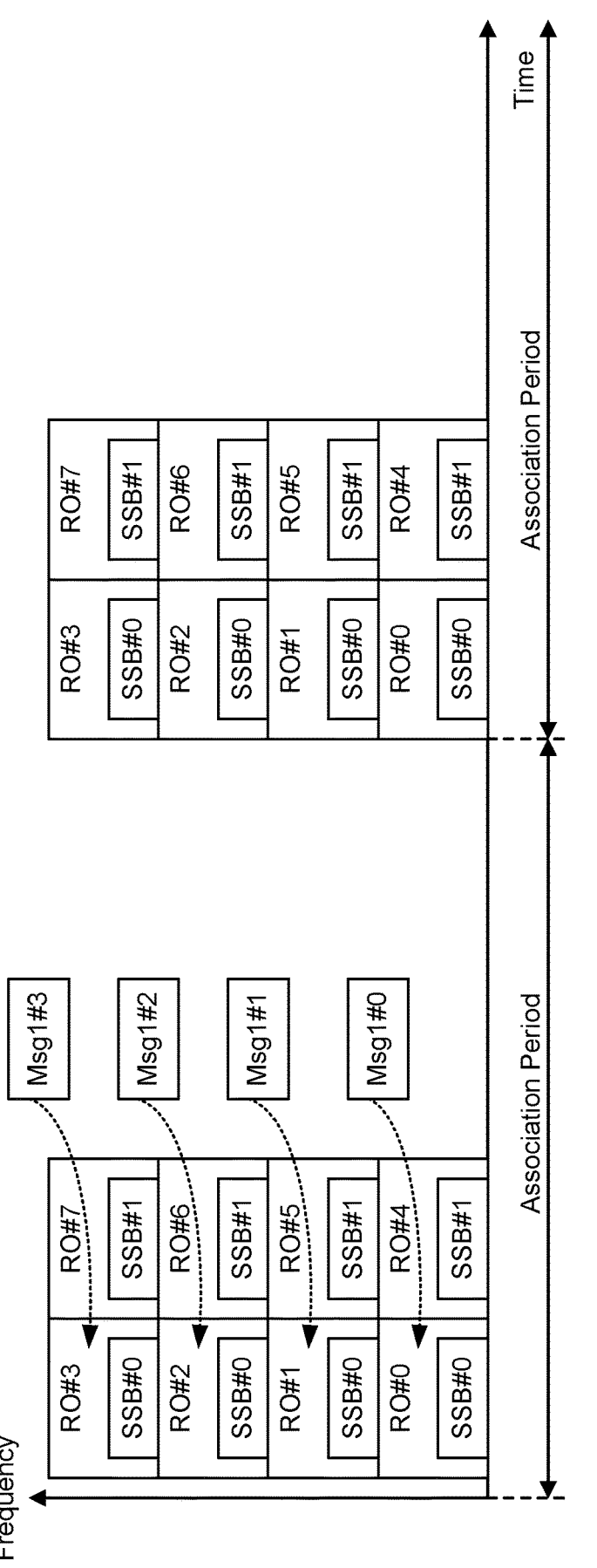
FIG. 8B is a diagram illustrating an example of a multiple RACH transmission configuration, in accordance with the present disclosure.

FIG. 8B is a diagram illustrating an example 810 of a multiple RACH transmission configuration, in accordance with the present disclosure.

As shown in FIG. 8B, a first SSB (SSB #0) may be mapped to a first RACH occasion (RO #0) (e.g., the first RACH occasion, RO #0, is shown as being within a same frequency block as the first SSB, SSB #0), a second SSB (SSB #1) may be mapped to a second RACH occasion (RO #1), a third SSB (SSB #2) may be mapped to a third RACH occasion (RO #2,) and a fourth SSB (SSB #3) may be mapped to a fourth RACH occasion (RO #0). An SSB may be mapped to a RACH occasion in accordance with a one-to-one mapping. Each RACH occasion may include frequency and time resources.

In some cases, multiple RACH transmissions (e.g., Msg1 repetitions) can be transmitted in multiple RACH occasions. For example, as shown, a first RACH transmission (Msg1 #0) can be transmitted in the first RACH occasion (RO #0), a second RACH transmission (Msg1 #1) can be transmitted in the second RACH occasion (RO #1), a third RACH transmission (Msg1 #2) can be transmitted in the third RACH occasion (RO #2), and a fourth RACH transmission (Msg1 #3) can be transmitted in the fourth RACH occasion (RO #3).

In a full-duplex configuration, two types of slots with uplink transmissions can be utilized—half-duplex uplink slots and full-duplex slots. Full-duplex slots can suffer from self-interference at the network and/or the UE, as well as from inter-UE CLI. Moreover, in an SBFD slot, some of the uplink resources are not available for uplink (e.g., resources associated with a downlink subband or a guard band). Resources at the edge of a downlink subband also can be associated with high levels of interference. As a result, a configuration for transmitting a defined number of RACH transmissions in a slot having a number of RACH occasions distributed in the frequency domain can result in some RACH transmissions being omitted. One mitigation could be to schedule RACH transmissions only in half-duplex uplink slots, but this mitigation results in an inability to achieve the efficiencies offered by full-duplex slots and can result in a smaller number of RACH transmissions. Another mitigation could be to only schedule full-duplex slots. However, this mitigation results in an inability to achieve the coverage advantages of half-duplex slots.

Some aspects of the techniques and apparatuses described herein may provide a flexible multiple RACH transmission scheme utilizing half-duplex slots and full-duplex slots. For example, in some aspects, a network node may configure a UE with different quantities of RACH transmissions for each slot type. For example, in some aspects, the network node may transmit an indication of a quantity of RACH transmissions for half-duplex slots and a quantity of RACH transmissions for full-duplex slots. In some aspects, a quantity of RACH transmissions for full-duplex slots may be a function of a quantity of RACH transmissions for half-duplex slots. In some aspects, a number of RACH occasions in a slot may be a function of a number of uplink resources in the slot. In some aspects, a UE may reduce a number of RACH transmissions in a full-duplex slot so that all of the RACH transmissions in the slot are associated with an uplink subband. In this way, some aspects may facilitate a flexible configuration in which different types of slots may have different quantities of RACH transmissions, thereby facilitating a balance between RACH coverage and the benefits of using both half-duplex slots and full-duplex slots. As a result, some aspects may improve RACH coverage while mitigating negative effects on efficiency of resource use, thereby positively impacting network and/or device performance.

Some aspects also may facilitate flexible RACH transmission configurations that mitigate interference at subband edges in full-duplex slots. In some aspects, for example, if the UE is configured to transmit a defined number of RACH transmissions, the UE may transmit using a first valid RACH occasion and then subsequent RACH occasions, working toward the uplink subband edge. For example, a first valid RACH occasion may be a RACH occasion associated with a gap between the RACH occasion and a frequency of an adjacent downlink subband that satisfies a threshold. In some aspects, a UE may limit a RACH transmission power associated with a RACH occasion adjacent to an edge of a downlink subband. The RACH transmission power may be limited by a maximum transmission power that may be indicated by the network node. In this way, some aspects may facilitate mitigation of interference at subband edges in multiple RACH transmission configurations, thereby positively impacting network and/or device performance.

As indicated above, FIG. 8B is provided as an example. Other examples may differ from what is described with regard to FIG. 8B.

Figure 9:
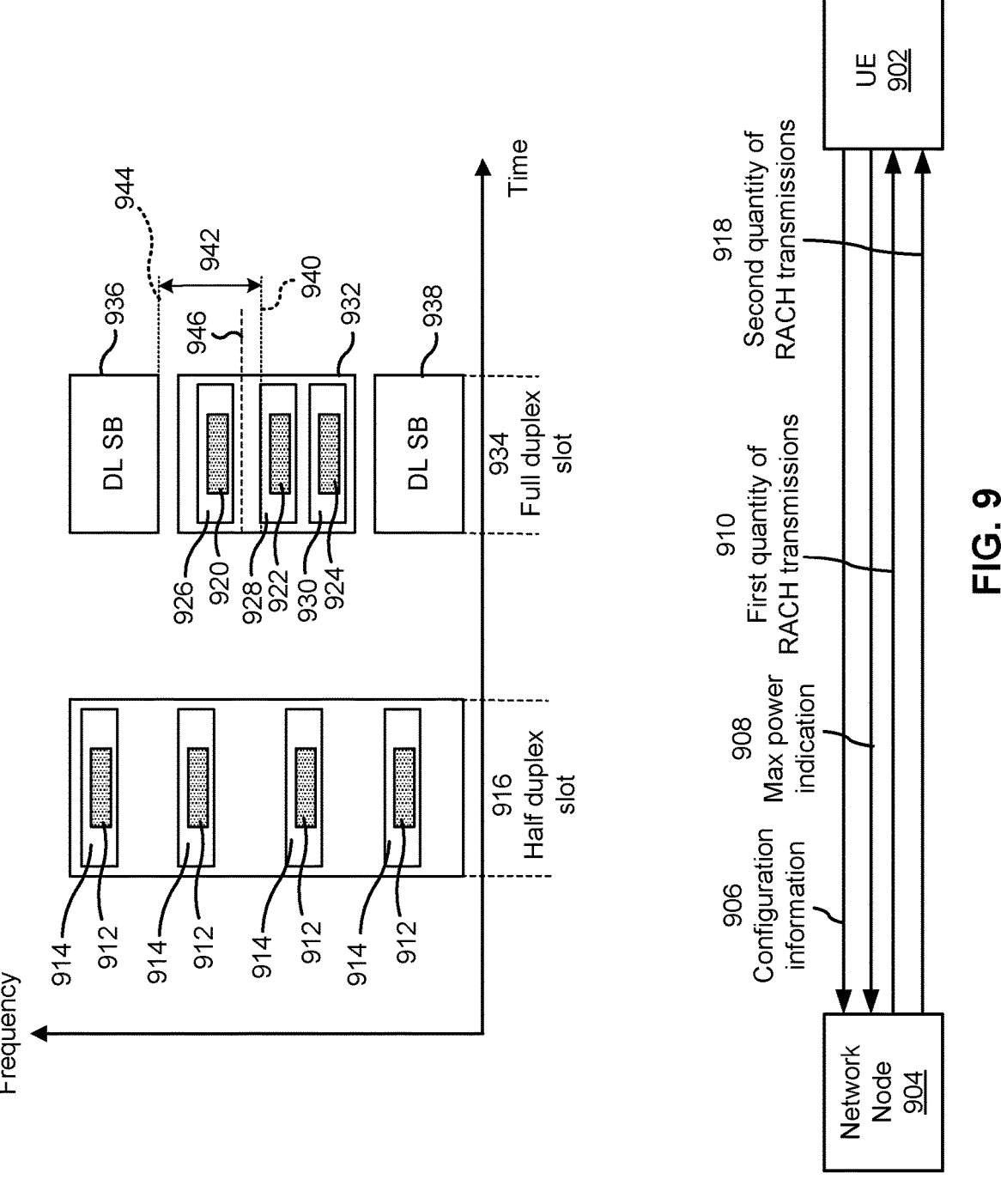
FIG. 9 is a diagram illustrating an example associated with RACH transmission repetition in full-duplex communications, in accordance with the present disclosure.

FIG. 9 is a diagram illustrating an example 900 associated with RACH transmission repetition in full-duplex communications, in accordance with the present disclosure. As shown in FIG. 9, a UE 902 and a network node 904 may communicate with one another. In some aspects, the UE 902 may be, be similar to, include, or be included in, the UE1 and/or the UE2 depicted in FIG. 5, the UE1 402, the UE 1 402-1, and/or the UE2 402-2 depicted in FIGS. 4A-4C, and/or the UE 120 depicted in FIGS. 1-3, 7A, and 7B. In some aspects, the network node 904 may be, be similar to, include, or be included in, the NN1 and/or NN2 depicted in FIG. 5, the network node 404, 404-1, and/or 404-2 depicted in FIGS. 4A-4C, the network node 110 depicted in FIGS. 1, 2, 7A, and 7B, and/or one or more components of the disaggregated base station architecture 300 depicted in FIG. 3.

As shown by reference number 906, the network node 904 may transmit, and the UE 902 may receive, configuration information. In some aspects, the network node 904 may broadcast the configuration information and/or transmit the configuration information using RRC signalling. The configuration information may be associated with a RACH transmission repetition scheme. The RACH transmission repetition scheme may include, for example, information associated with repetitions of RACH transmissions in an SBFD configuration. In some aspects, the configuration information may be indicative of a first quantity of RACH transmissions associated with a half-duplex slot type and a second quantity of RACH transmissions associated with a full-duplex slot type.

In some aspects, the configuration information may explicitly indicate the first quantity and the second quantity. For example, the configuration information may indicate a quantity of four RACH transmissions for a half-duplex slot type and three RACH transmissions for a full-duplex slot type. In some aspects, the second quantity may be based on a function of the first quantity. For example, the configuration information and/or a wireless communication standard may indicate that a quantity of RACH transmissions in a full-duplex slot is a function (e.g., a scaled quantity) of a quantity of RACH transmissions in a half-duplex slot. For example, in some aspects, the second quantity, $N\_FD$, may be defined as a floor function of one half of the first quantity: $N\_FD=floor(N\_HD/2)$. Any number of other different functions may be used to relate the second quantity to the first quantity.

In some aspects, the first quantity may be based on a function of a first quantity of uplink resources in the half-duplex slot and the second quantity may be based on a function of a second quantity of uplink resources in the full-duplex slot. In some aspects, the second quantity may be based on a set of resources associated with an uplink subband of the full-duplex slot. For example, in some aspects, the UE 902 may reduce the quantity of RACH transmissions in a full-duplex slot to be within an uplink subband.

As shown by reference number 908, the network node 904 may transmit, and the UE 902 may receive, an indication of a maximum transmission power (shown as "max power indication"). The maximum transmission power may be, for example, an upper limit to the transmission power that the UE 902 is to use to transmit RACH transmissions. In some aspects, the maximum transmission power may apply to RACH occasions at or near (referred to herein as "adjacent to") an edge of a downlink subband. RACH transmissions in RACH occasions adjacent to an edge of a downlink subband may cause inter-UE CLI and/or self-interference at a full-duplex UE. By limiting the transmission power of RACH transmissions in those RACH occasions, interference may be mitigated.

As shown by reference number 910, the UE 902 may transmit, and the network node 904 may receive, a first quantity of RACH transmissions 912. The first quantity of RACH transmissions may be transmitted in respective RACH occasions 914 in a half-duplex slot 916. The first quantity of RACH transmissions may be transmitted in accordance with the RACH transmission repetition scheme. Although FIG. 9 shows the first quantity of RACH transmissions as including four transmissions, the first quantity may include any number of configured transmissions.

As shown by reference number 918, the UE 902 may transmit, and the network node 904 may receive, a second quantity of RACH transmissions 920, 922, and 924. Although FIG. 9 shows the second quantity as including three transmissions, the second quantity may include any number of configured transmissions. The second quantity of RACH transmissions 920, 922, and 924 may be transmitted in respective RACH occasions 926, 928, and 930 in an uplink subband 932 of a full-duplex slot 934. The second quantity of RACH transmissions may be transmitted in accordance with the RACH transmission repetition scheme.

In an SBFD slot, not all RACH occasions are equally suited for RACH transmissions. For example, some RACH occasions may overlap with a downlink subband 936 or 938, which may render those RACH occasions unavailable for RACH transmissions. Some RACH occasions may be adjacent to an edge of a downlink subband 936 or 938 and, therefore, may be associated with higher interference than other RACH occasions. In some aspects, for multiple RACH transmissions, if the UE 902 is configured to transmit x RACH transmissions, the UE 902 may start with a "first valid RACH occasion" and then subsequently transmit in RACH occasions closer to a subband edge.

For example, the UE 902 may transmit, in the uplink subband 932, a first RACH transmission 922 of the second quantity of RACH transmissions in a first valid RACH occasion 928. The first valid RACH occasion 928 may be a RACH occasion associated with a first frequency 940 that corresponds to a first frequency gap 942 between the first frequency 940 and a downlink frequency 944 associated with an adjacent downlink subband 936. In some aspects, although the first frequency 940 is shown as a highest frequency of the RACH occasion 928, the first frequency 940 may be a center frequency and/or a lowest frequency of the RACH occasion, among other examples. Similarly, although illustrated as being a lowest frequency of the downlink subband 936, the downlink frequency 944 may be a center frequency of the downlink subband 936 and/or an upper frequency of the downlink subband 936, among other examples.

In some aspects, the UE 902 may transmit the first RACH transmission prior to transmitting a second RACH transmission based on the first frequency gap 942 satisfying a minimum gap threshold 946. The minimum gap threshold 946 may indicate a minimum distance (in the frequency domain) that a first valid RACH occasion can be from an edge of an adjacent downlink subband. In some aspects, the UE 902 may transmit a second RACH transmission in a second valid RACH occasion associated with a second frequency that corresponds to a second frequency gap (not shown) between the second frequency and the downlink frequency 944, where the first frequency gap 942 is wider than the second frequency gap. In some aspects, the UE 902 may transmit a RACH transmission 920 in a RACH occasion 926 using a transmission power that is no greater than a maximum transmission power based on the RACH occasion 926 being adjacent to an edge (e.g., a downlink frequency 944 such as a lowest frequency or a highest frequency) of a downlink subband 936.

As indicated above, FIG. 9 is provided as an example. Other examples may differ from what is described with respect to FIG. 9.

FIG. 10 is a diagram illustrating an example process 1000 performed, for example, by a UE, in accordance with the present disclosure. Example process 1000 is an example where the UE (e.g., UE 902) performs operations associated with RACH transmission repetition.

As shown in FIG. 10, in some aspects, process 1000 may include transmitting, in a half-duplex slot and in accordance with a RACH transmission repetition scheme, a first quantity of RACH transmissions (block 1010). For example, the UE (e.g., using transmission component 1404 and/or communication manager 1406, depicted in FIG. 14) may transmit, in a half-duplex slot and in accordance with a RACH transmission repetition scheme, a first quantity of RACH transmissions, as described above. The first quantity of RACH transmissions may include Msg1 transmissions of a four-step RACH procedure or MsgA transmissions of a two-step RACH procedure. The first quantity of RACH transmissions may be transmitted in respective RACH occasions within the half-duplex slot. The RACH occasions may be associated with respective SSBs and may be distributed along a frequency domain.

As further shown in FIG. 10, in some aspects, process 1000 may include transmitting, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively (block 1020). For example, the UE (e.g., using transmission component 1404 and/or communication manager 1406, depicted in FIG. 14) may transmit, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively, as described above. The second quantity of RACH transmissions may include Msg1 transmissions of a four-step RACH procedure or MsgA transmissions of a two-step RACH procedure. The second quantity of RACH transmissions may be transmitted in respective RACH occasions within the half-duplex slot. The RACH occasions may be associated with respective SSBs and may be distributed along a frequency domain. The second quantity may be equal to, or different from, the first quantity.

Process 1000 may include additional aspects, such as any single aspect or any combination of aspects described below and/or in connection with one or more other processes described elsewhere herein.

In a first aspect, process 1000 includes receiving configuration information associated with the RACH transmission repetition scheme, the configuration information indicative of the first quantity and the second quantity. In a second aspect, alone or in combination with the first aspect, the configuration information explicitly indicates the first quantity and the second quantity. In a third aspect, alone or in combination with one or more of the first and second aspects, the second quantity is based on a function of the first quantity. In a fourth aspect, alone or in combination with one or more of the first through third aspects, a first quantity of RACH occasions in the half-duplex slot is based on a function of a first quantity of uplink resources in the half-duplex slot, and a second quantity of RACH occasions in the full-duplex slot is based on a function of a second quantity of uplink resources in the full-duplex slot.

In a fifth aspect, alone or in combination with one or more of the first through fourth aspects, the second quantity is based on a set of resources associated with an uplink subband of the full-duplex slot. In a sixth aspect, alone or in combination with the fifth aspect, transmitting the second quantity of RACH transmissions comprises transmitting the second quantity of RACH transmissions in the uplink subband. In a seventh aspect, alone or in combination with one or more of the first through sixth aspects, transmitting the second quantity of RACH transmissions comprises transmitting, in an uplink subband, a first RACH transmission of the second quantity of RACH transmissions in a first valid RACH occasion, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the second quantity of RACH transmissions based on the first frequency gap satisfying a minimum gap threshold, and transmitting, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

In an eighth aspect, alone or in combination with one or more of the first through seventh aspects, transmitting the second quantity of RACH transmissions comprises transmitting, in an uplink subband, a RACH transmission in a RACH occasion using a transmission power that is no greater than a maximum transmission power, wherein transmitting the RACH transmission using the transmission power comprises transmitting the RACH transmission using the transmission power based on the RACH occasion being adjacent to an edge of a downlink subband. In a ninth aspect, alone or in combination with the eighth aspect, process 1000 includes receiving an indication of the maximum transmission power. In a tenth aspect, alone or in combination with the ninth aspect, receiving the indication comprises receiving a broadcast communication that includes the indication. In an eleventh aspect, alone or in combination with one or more of the ninth or tenth aspects, receiving the indication comprises receiving a radio resource control message that includes the indication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a network node, in accordance with the present disclosure. Example process 1100 is an example where the network node (e.g., network node 904) performs operations associated with RACH transmission repetition.

As shown in FIG. 11, in some aspects, process 1100 may include receiving, in a half-duplex slot and in accordance with a RACH transmission repetition scheme, a first quantity of RACH transmissions (block 1110). For example, the network node (e.g., using reception component 1502 and/or communication manager 1506, depicted in FIG. 15) may receive, in a half-duplex slot and in accordance with a RACH transmission repetition scheme, a first quantity of RACH transmissions, as described above. The first quantity of RACH transmissions may include Msg1 transmissions of a four-step RACH procedure or MsgA transmissions of a two-step RACH procedure. The first quantity of RACH transmissions may be transmitted in respective RACH occasions within the half-duplex slot. The RACH occasions may be associated with respective SSBs and may be distributed along a frequency domain.

As further shown in FIG. 11, in some aspects, process 1100 may include receiving, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively (block 1120). For example, the network node (e.g., using reception component 1502 and/or communication manager 1506, depicted in FIG. 15) may receive, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively, as described above. The second quantity of RACH transmissions may include Msg1 transmissions of a four-step RACH procedure or MsgA transmissions of a two-step RACH procedure. The second quantity of RACH transmissions may be transmitted in respective RACH occasions within the half-duplex slot. The RACH occasions may be associated with respective SSBs and may be distributed along a frequency domain. The second quantity may be equal to, or different from, the first quantity.

Process 1100 may include additional aspects, such as any single aspect or any combination of aspects described below and/or in connection with one or more other processes described elsewhere herein.

In a first aspect, process 1100 includes transmitting configuration information associated with the RACH transmission repetition scheme, the configuration information indicative of the first quantity and the second quantity. In a second aspect, alone or in combination with the first aspect, the configuration information explicitly indicates the first quantity and the second quantity. In a third aspect, alone or in combination with one or more of the first and second aspects, the second quantity is based on a function of the first quantity. In a fourth aspect, alone or in combination with one or more of the first through third aspects, a first quantity of RACH occasions in the half-duplex slot is based on a function of a first quantity of uplink resources in the half-duplex slot and a second quantity of RACH occasions in the full-duplex slot is based on a function of a second quantity of uplink resources in the full-duplex slot. In a fifth aspect, alone or in combination with one or more of the first through fourth aspects, the second quantity is based on a set of resources associated with an uplink subband of the full-duplex slot. In a sixth aspect, alone or in combination with the fifth aspect, receiving the second quantity of RACH transmissions comprises receiving the second quantity of RACH transmissions in the uplink subband.

In a seventh aspect, alone or in combination with one or more of the first through sixth aspects, receiving the second quantity of RACH transmissions comprises receiving, in an uplink subband, a first RACH transmission of the second quantity of RACH transmissions in a first valid RACH occasion, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the second quantity of RACH transmissions based on the first frequency gap satisfying a minimum gap threshold, and receiving, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

In an eighth aspect, alone or in combination with one or more of the first through seventh aspects, receiving the second quantity of RACH transmissions comprises receiving, in an uplink subband, a RACH transmission in a RACH occasion using a transmission power that is no greater than a maximum transmission power, wherein receiving the RACH transmission using the transmission power comprises receiving the RACH transmission using the transmission power based on the RACH occasion being adjacent to an edge of a downlink subband. In a ninth aspect, alone or in combination with the eighth aspect, process 1100 includes transmitting an indication of the maximum transmission power. In a tenth aspect, alone or in combination with the ninth aspect, transmitting the indication comprises transmitting a broadcast communication that includes the indication. In an eleventh aspect, alone or in combination with one or more of the ninth or tenth aspects, transmitting the indication comprises transmitting a radio resource control message that includes the indication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a UE, in accordance with the present disclosure. Example process 1200 is an example where the UE (e.g., UE 902) performs operations associated with RACH transmission repetition.

As shown in FIG. 12, in some aspects, process 1200 may include transmitting, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the plurality of RACH transmissions based on the first frequency gap satisfying a minimum gap threshold (block 1210). For example, the UE (e.g., using transmission component 1404 and/or communication manager 1406, depicted in FIG. 14) may transmit, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the plurality of RACH transmissions based on the first frequency gap satisfying a minimum gap threshold, as described above.

As further shown in FIG. 12, in some aspects, process 1200 may include transmitting, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap (block 1220). For example, the UE (e.g., using transmission component 1404 and/or communication manager 1406, depicted in FIG. 14) may transmit, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap, as described above.

Process 1200 may include additional aspects, such as any single aspect or any combination of aspects described below and/or in connection with one or more other processes described elsewhere herein.

In a first aspect, transmitting the second RACH transmission comprises transmitting the second RACH transmission using a transmission power that is no greater than a maximum transmission power, wherein transmitting the second RACH transmission using the transmission power comprises transmitting the second RACH transmission using the transmission power based on the second valid RACH occasion being adjacent to an edge of the adjacent downlink subband. In a second aspect, alone or in combination with the first aspect, process 1200 includes receiving an indication of the maximum transmission power. In a third aspect, alone or in combination with one or more of the first and second aspects, receiving the indication comprises receiving a broadcast communication that includes the indication. In a fourth aspect, alone or in combination with one or more of the first through third aspects, receiving the indication comprises receiving an RRC message that includes the indication.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a network node, in accordance with the present disclosure. Example process 1300 is an example where the network node (e.g., network node 110) performs operations associated with RACH transmission repetition.

As shown in FIG. 13, in some aspects, process 1300 may include receiving, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the plurality of RACH transmissions based on the first frequency gap satisfying a minimum gap threshold (block 1310). For example, the network node (e.g., using reception component 1502 and/or communication manager 1506, depicted in FIG. 15) may receive, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the plurality of RACH transmissions based on the first frequency gap satisfying a minimum gap threshold, as described above.

As further shown in FIG. 13, in some aspects, process 1300 may include receiving, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap (block 1320). For example, the network node (e.g., using reception component 1502 and/or communication manager 1506, depicted in FIG. 15) may receive, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap, as described above.

Process 1300 may include additional aspects, such as any single aspect or any combination of aspects described below and/or in connection with one or more other processes described elsewhere herein.

In a first aspect, receiving the second RACH transmission comprises receiving the second RACH transmission based on a transmission power that is no greater than a maximum transmission power, wherein receiving the second RACH transmission using the transmission power comprises receiving the second RACH transmission based on the transmission power based on the second valid RACH occasion being adjacent to an edge of the adjacent downlink subband. In a second aspect, alone or in combination with the first aspect, process 1300 includes transmitting an indication of the maximum transmission power. In a third aspect, alone or in combination with one or more of the first and second aspects, transmitting the indication comprises transmitting a broadcast communication that includes the indication. In a fourth aspect, alone or in combination with one or more of the first through third aspects, transmitting the indication comprises transmitting an RRC message that includes the indication.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
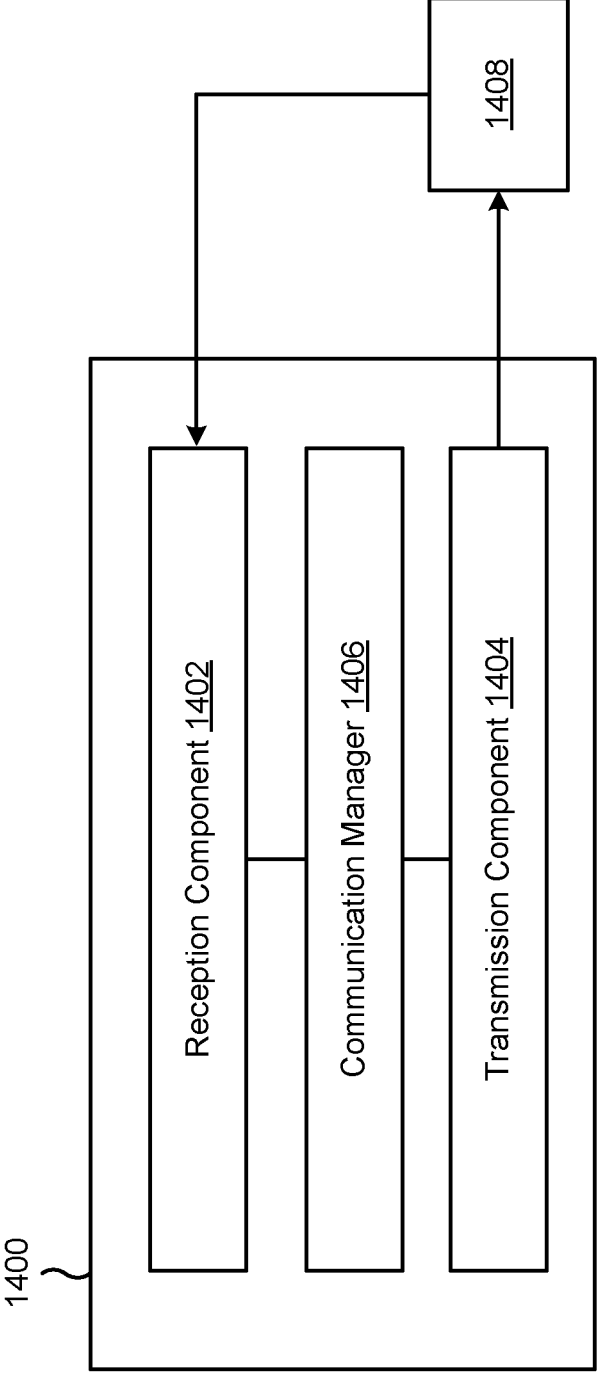
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a UE, or a UE may include the apparatus 1400. In some aspects, the apparatus 1400 includes a reception component 1402, a transmission component 1404, and/or a communication manager 1406, which may be in communication with one another (for example, via one or more buses and/or one or more other components). In some aspects, the communication manager 1406 is the communication manager 140 described in connection with FIG. 1. As shown, the apparatus 1400 may communicate with another apparatus 1408, such as a UE or a network node (such as a CU, a DU, an RU, or a base station), using the reception component 1402 and the transmission component 1404.

In some aspects, the apparatus 1400 may be configured to perform one or more operations described herein in connection with FIG. 9. Additionally, or alternatively, the apparatus 1400 may be configured to perform one or more processes described herein, such as process 1000 of FIG. 10, process 1200 of FIG. 12, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The transmission component 1404 may transmit, in a half-duplex slot and in accordance with a RACH transmission repetition scheme, a first quantity of RACH transmissions. The transmission component 1404 may transmit, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively. The reception component 1402 may receive configuration information associated with the RACH transmission repetition scheme, the configuration information indicative of the first quantity and the second quantity. The reception component 1402 may receive an indication of the maximum transmission power.

The transmission component 1404 may transmit, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the plurality of RACH transmissions based on the first frequency gap satisfying a minimum gap threshold. The transmission component 1404 may transmit, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap. The reception component 1402 may receive an indication of the maximum transmission power. The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
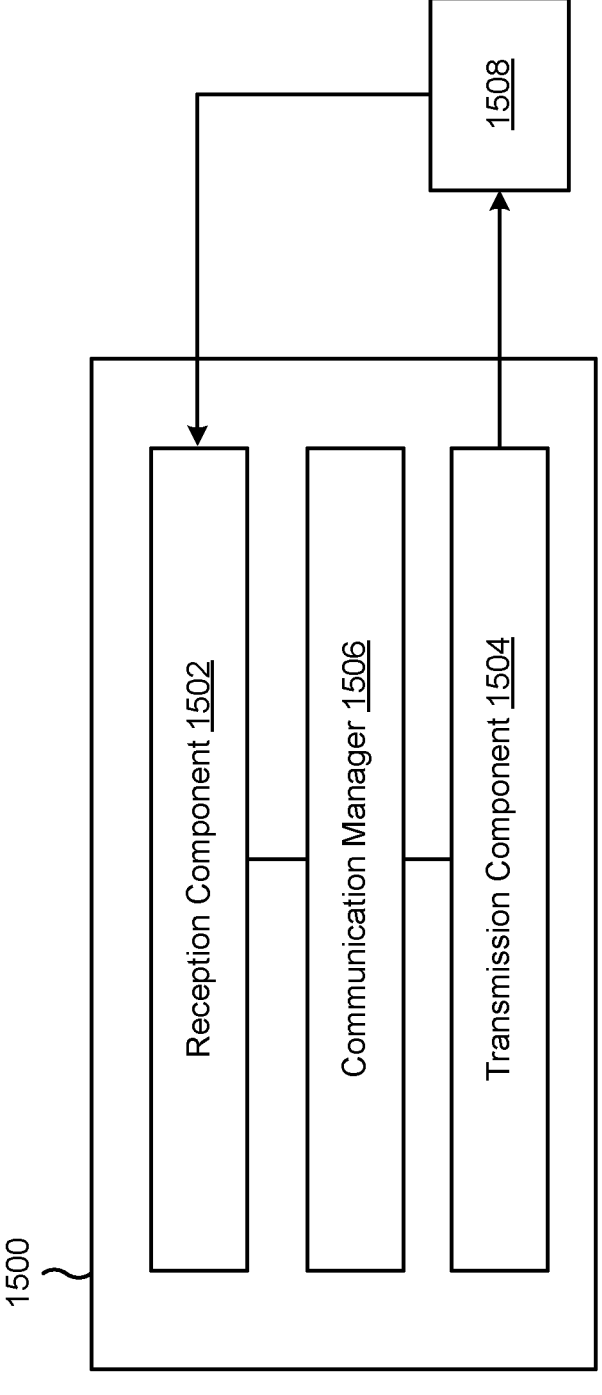
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a network node, or a network node may include the apparatus 1500. In some aspects, the apparatus 1500 includes a reception component 1502, a transmission component 1504, and/or a communication manager 1506, which may be in communication with one another (for example, via one or more buses and/or one or more other components). In some aspects, the communication manager 1506 is the communication manager 150 described in connection with FIG. 1. As shown, the apparatus 1500 may communicate with another apparatus 1508, such as a UE or a network node (such as a CU, a DU, an RU, or a base station), using the reception component 1502 and the transmission component 1504.

In some aspects, the apparatus 1500 may be configured to perform one or more operations described herein in connection with FIG. 9. Additionally, or alternatively, the apparatus 1500 may be configured to perform one or more processes described herein, such as process 1100 of FIG. 11, process 1300 of FIG. 13, or a combination thereof. In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1508. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2. In some aspects, the reception component 1502 and/or the transmission component 1504 may include or may be included in a network interface. The network interface may be configured to obtain and/or output signals for the apparatus 1500 via one or more communications links, such as a backhaul link, a midhaul link, and/or a fronthaul link.

The transmission component 1504 may transmit communications, such as reference signals, control information, data communications, or a combination thereof, to the apparatus 1508. In some aspects, one or more other components of the apparatus 1500 may generate communications and may provide the generated communications to the transmission component 1504 for transmission to the apparatus 1508. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1504 may include one or more antennas, a modem, a modulator, a transmit MIMO processor, a transmit processor, a controller/ processor, a memory, or a combination thereof, of the network node described in connection with FIG. 2. In some aspects, the transmission component 1504 may be co-located with the reception component 1502 in a transceiver.

The reception component 1502 may receive, in a half-duplex slot and in accordance with a RACH transmission repetition scheme, a first quantity of RACH transmissions. The reception component 1502 may receive, in accordance with the RACH transmission repetition scheme and in a full-duplex slot associated with an SBFD configuration, a second quantity of RACH transmissions, the first quantity and the second quantity being based on a half-duplex slot type and a full-duplex slot type, respectively. The transmission component 1504 may transmit configuration information associated with the RACH transmission repetition scheme, the configuration information indicative of the first quantity and the second quantity. The transmission component 1504 may transmit an indication of the maximum transmission power.

The reception component 1502 may receive, in a first valid RACH occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the plurality of RACH transmissions based on the first frequency gap satisfying a minimum gap threshold. The reception component 1502 may receive, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap. The transmission component 1504 may transmit an indication of the maximum transmission power.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: transmitting, in a half-duplex slot and in accordance with a random access channel (RACH) transmission repetition scheme, a first quantity of RACH transmissions; and transmitting, in accordance with the RACH transmission repetition scheme and in a full-duplex slot associated with a subband full-duplex (SBFD) configuration, a second quantity of RACH transmissions, the first quantity and the second quantity being based on a half-duplex slot type and a full-duplex slot type, respectively.

Aspect 2: The method of Aspect 1, further comprising receiving configuration information associated with the RACH transmission repetition scheme, the configuration information indicative of the first quantity and the second quantity.

Aspect 3: The method of Aspect 2, wherein the configuration information explicitly indicates the first quantity and the second quantity.

Aspect 4: The method of any of Aspects 1-3, wherein the second quantity is based on a function of the first quantity.

Aspect 5: The method of any of Aspects 1-4, wherein a first quantity of RACH occasions in the half-duplex slot is based on a function of a first quantity of uplink resources in the half-duplex slot and a second quantity of RACH occasions in the full-duplex slot is based on a function of a second quantity of uplink resources in the full-duplex slot.

Aspect 6: The method of any of Aspects 1-5, wherein the second quantity is based on a set of resources associated with an uplink subband of the full-duplex slot.

Aspect 7: The method of Aspect 6, wherein transmitting the second quantity of RACH transmissions comprises transmitting the second quantity of RACH transmissions in the uplink subband.

Aspect 8: The method of any of Aspects 1-7, wherein transmitting the second quantity of RACH transmissions comprises: transmitting, in an uplink subband, a first RACH transmission of the second quantity of RACH transmissions in a first valid RACH occasion, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the second quantity of RACH transmissions based on the first frequency gap satisfying a minimum gap threshold; and transmitting, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

Aspect 9: The method of any of Aspects 1-8, wherein transmitting the second quantity of RACH transmissions comprises transmitting, in an uplink subband, a RACH transmission in a RACH occasion using a transmission power that is no greater than a maximum transmission power, wherein transmitting the RACH transmission using the transmission power comprises transmitting the RACH transmission using the transmission power based on the RACH occasion being adjacent to an edge of a downlink subband.

Aspect 10: The method of Aspect 9, further comprising receiving an indication of the maximum transmission power.

Aspect 11: The method of Aspect 10, wherein receiving the indication comprises receiving a broadcast communication that includes the indication.

Aspect 12: The method of either of Aspects 10 or 11, wherein receiving the indication comprises receiving a radio resource control message that includes the indication.

Aspect 13: A method of wireless communication performed by a network node, comprising: receiving, in a half-duplex slot and in accordance with a random access channel (RACH) transmission repetition scheme, a first quantity of RACH transmissions; and receiving, in accordance with the RACH transmission repetition scheme and in a full-duplex slot associated with a subband full-duplex (SBFD) configuration, a second quantity of RACH transmissions, the first quantity and the second quantity being based on a half-duplex slot type and a full-duplex slot type, respectively.

Aspect 14: The method of Aspect 13, further comprising transmitting configuration information associated with the RACH transmission repetition scheme, the configuration information indicative of the first quantity and the second quantity.

Aspect 15: The method of Aspect 14, wherein the configuration information explicitly indicates the first quantity and the second quantity.

Aspect 16: The method of any of Aspects 13-15, wherein the second quantity is based on a function of the first quantity.

Aspect 17: The method of any of Aspects 13-16, wherein a first quantity of RACH occasions in the half-duplex slot is based on a function of a first quantity of uplink resources in the half-duplex slot and a second quantity of RACH occasions in the full-duplex slot is based on a function of a second quantity of uplink resources in the full-duplex slot.

Aspect 18: The method of any of Aspects 13-17, wherein the second quantity is based on a set of resources associated with an uplink subband of the full-duplex slot.

Aspect 19: The method of Aspect 18, wherein receiving the second quantity of RACH transmissions comprises receiving the second quantity of RACH transmissions in the uplink subband.

Aspect 20: The method of any of Aspects 13-19, wherein receiving the second quantity of RACH transmissions comprises: receiving, in an uplink subband, a first RACH transmission of the second quantity of RACH transmissions in a first valid RACH occasion, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the second quantity of RACH transmissions based on the first frequency gap satisfying a minimum gap threshold; and receiving, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

Aspect 21: The method of any of Aspects 13-20, wherein receiving the second quantity of RACH transmissions comprises receiving, in an uplink subband, a RACH transmission in a RACH occasion using a transmission power that is no greater than a maximum transmission power, wherein receiving the RACH transmission using the transmission power comprises receiving the RACH transmission using the transmission power based on the RACH occasion being adjacent to an edge of a downlink subband.

Aspect 22: The method of Aspect 21, further comprising transmitting an indication of the maximum transmission power.

Aspect 23: The method of Aspect 22, wherein transmitting the indication comprises transmitting a broadcast communication that includes the indication.

Aspect 24: The method of either of Aspects 22 or 23, wherein transmitting the indication comprises transmitting a radio resource control message that includes the indication.

Aspect 25: A method of wireless communication performed by a user equipment (UE), comprising: transmitting, in a first valid random access channel (RACH) occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the plurality of RACH transmissions based on the first frequency gap satisfying a minimum gap threshold; and transmitting, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

Aspect 26: The method of Aspect 25, wherein transmitting the second RACH transmission comprises transmitting the second RACH transmission using a transmission power that is no greater than a maximum transmission power, wherein transmitting the second RACH transmission using the transmission power comprises transmitting the second RACH transmission using the transmission power based on the second valid RACH occasion being adjacent to an edge of the adjacent downlink subband.

Aspect 27: The method of Aspect 26, further comprising receiving an indication of the maximum transmission power.

Aspect 28: The method of Aspect 27, wherein receiving the indication comprises receiving a broadcast communication that includes the indication.

Aspect 29: The method of either of Aspects 27 or 28, wherein receiving the indication comprises receiving a radio resource control message that includes the indication.

Aspect 30: A method of wireless communication performed by a network node, comprising: receiving, in a first valid random access channel (RACH) occasion of an uplink subband associated with a subband full-duplex configuration, a first RACH transmission of a plurality of RACH transmissions, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the plurality of RACH transmissions based on the first frequency gap satisfying a minimum gap threshold; and receiving, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

Aspect 31: The method of Aspect 30, wherein receiving the second RACH transmission comprises receiving the second RACH transmission based on a transmission power that is no greater than a maximum transmission power, wherein receiving the second RACH transmission using the transmission power comprises receiving the second RACH transmission based on the transmission power based on the second valid RACH occasion being adjacent to an edge of the adjacent downlink subband.

Aspect 32: The method of Aspect 31, further comprising transmitting an indication of the maximum transmission power.

Aspect 33: The method of Aspect 32, wherein transmitting the indication comprises transmitting a broadcast communication that includes the indication.

Aspect 34: The method of either of Aspects 32 or 33, wherein transmitting the indication comprises transmitting a radio resource control message that includes the indication.

Aspect 35: An apparatus for wireless communication at a device, comprising a processor; memory coupled with the processor; and instructions stored in the memory and executable by the processor to cause the apparatus to perform the method of one or more of Aspects 1-12.

Aspect 36: A device for wireless communication, comprising a memory and one or more processors coupled to the memory, the one or more processors configured to perform the method of one or more of Aspects 1-12.

Aspect 37: An apparatus for wireless communication, comprising at least one means for performing the method of one or more of Aspects 1-12.

Aspect 38: A non-transitory computer-readable medium storing code for wireless communication, the code comprising instructions executable by a processor to perform the method of one or more of Aspects 1-12.

Aspect 39: A non-transitory computer-readable medium storing a set of instructions for wireless communication, the set of instructions comprising one or more instructions that, when executed by one or more processors of a device, cause the device to perform the method of one or more of Aspects 1-12.

Aspect 40: An apparatus for wireless communication at a device, comprising a processor; memory coupled with the processor; and instructions stored in the memory and executable by the processor to cause the apparatus to perform the method of one or more of Aspects 13-24.

Aspect 41: A device for wireless communication, comprising a memory and one or more processors coupled to the memory, the one or more processors configured to perform the method of one or more of Aspects 13-24.

Aspect 42: An apparatus for wireless communication, comprising at least one means for performing the method of one or more of Aspects 13-24.

Aspect 43: A non-transitory computer-readable medium storing code for wireless communication, the code comprising instructions executable by a processor to perform the method of one or more of Aspects 13-24.

Aspect 44: A non-transitory computer-readable medium storing a set of instructions for wireless communication, the set of instructions comprising one or more instructions that, when executed by one or more processors of a device, cause the device to perform the method of one or more of Aspects 13-24.

Aspect 45: An apparatus for wireless communication at a device, comprising a processor; memory coupled with the processor; and instructions stored in the memory and executable by the processor to cause the apparatus to perform the method of one or more of Aspects 25-29.

Aspect 46: A device for wireless communication, comprising a memory and one or more processors coupled to the memory, the one or more processors configured to perform the method of one or more of Aspects 25-29.

Aspect 47: An apparatus for wireless communication, comprising at least one means for performing the method of one or more of Aspects 25-29.

Aspect 48: A non-transitory computer-readable medium storing code for wireless communication, the code comprising instructions executable by a processor to perform the method of one or more of Aspects 25-29.

Aspect 49: A non-transitory computer-readable medium storing a set of instructions for wireless communication, the set of instructions comprising one or more instructions that, when executed by one or more processors of a device, cause the device to perform the method of one or more of Aspects 25-29.

Aspect 50: An apparatus for wireless communication at a device, comprising a processor; memory coupled with the processor; and instructions stored in the memory and executable by the processor to cause the apparatus to perform the method of one or more of Aspects 30-34.

Aspect 51: A device for wireless communication, comprising a memory and one or more processors coupled to the memory, the one or more processors configured to perform the method of one or more of Aspects 30-34.

Aspect 52: An apparatus for wireless communication, comprising at least one means for performing the method of one or more of Aspects 30-34.

Aspect 53: A non-transitory computer-readable medium storing code for wireless communication, the code comprising instructions executable by a processor to perform the method of one or more of Aspects 30-34.

Aspect 54: A non-transitory computer-readable medium storing a set of instructions for wireless communication, the set of instructions comprising one or more instructions that, when executed by one or more processors of a device, cause the device to perform the method of one or more of Aspects 30-34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory; and
one or more processors, coupled to the memory, that, based at least in part on information stored in the memory, are configured to:
transmit, in a half-duplex slot and in accordance with a random access channel (RACH) transmission repetition scheme, a first quantity of RACH transmissions; and
transmit, in accordance with the RACH transmission repetition scheme and in a full-duplex slot associated with a subband full-duplex (SBFD) configuration, a second quantity of RACH transmissions, the first quantity and the second quantity being based on a half-duplex slot type and a full-duplex slot type, respectively, wherein transmitting the second quantity of RACH transmissions comprises transmitting, in an uplink subband, a RACH transmission in a RACH occasion using a transmission power no greater than a maximum transmission power, based at least in part on the RACH occasion being adjacent to an edge of a downlink subband.

2. The apparatus of claim 1, wherein the one or more processors are further configured to receive configuration information associated with the RACH transmission repetition scheme, the configuration information indicative of the first quantity and the second quantity.

3. The apparatus of claim 2, wherein the configuration information explicitly indicates the first quantity and the second quantity.

4. The apparatus of claim 1, wherein the second quantity is based on a function of the first quantity.

5. The apparatus of claim 1, wherein a first quantity of RACH occasions in the half-duplex slot is based on a function of a first quantity of uplink resources in the half-duplex slot and a second quantity of RACH occasions in the full-duplex slot is based on a function of a second quantity of uplink resources in the full-duplex slot.

6. The apparatus of claim 1, wherein the second quantity is based on a set of resources associated with an uplink subband of the full-duplex slot.

7. The apparatus of claim 6, wherein the one or more processors, to transmit the second quantity of RACH transmissions, are configured to transmit the second quantity of RACH transmissions in the uplink subband.

8. The apparatus of claim 1, wherein the one or more processors, to transmit the second quantity of RACH transmissions, are configured to:
transmit, in an uplink subband, a first RACH transmission of the second quantity of RACH transmissions in a first valid RACH occasion, the first valid RACH occasion comprising a RACH occasion associated with a first frequency that corresponds to a first frequency gap between the first frequency and a downlink frequency associated with an adjacent downlink subband, wherein transmitting the first RACH transmission comprises transmitting the first RACH transmission prior to transmitting a second RACH transmission of the second quantity of RACH transmissions based on the first frequency gap satisfying a minimum gap threshold; and
transmit, in the uplink subband and subsequent to transmitting the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

9. The apparatus of claim 1,
wherein the one or more processors are further configured to receive an indication of the maximum transmission power.

10. The apparatus of claim 9,
wherein the one or more processors, to receive the indication, are configured to receive a broadcast communication that includes the indication.

11. The apparatus of claim 9,
wherein the one or more processors, to receive the indication, are configured to receive a radio resource control message that includes the indication.

12. An apparatus for wireless communication at a network node, comprising:
a memory; and
one or more processors, coupled to the memory, that, based at least in part on information stored in the memory, are configured to:
receive, in a half-duplex slot and in accordance with a random access channel (RACH) transmission repetition scheme, a first quantity of RACH transmissions; and
receive, in accordance with the RACH transmission repetition scheme and in a full-duplex slot associated with a subband full-duplex (SBFD) configuration, a second quantity of RACH transmissions, the first quantity and the second quantity being based on a half-duplex slot type and a full-duplex slot type, respectively, wherein the one or more processors, to receive the second quantity of RACH transmissions, are configured to receive, in an uplink subband, a RACH transmission in a RACH occasion, the RACH transmission being transmitted using a transmission power that is no greater than a maximum transmission power based at least in part on the RACH occasion being adjacent to an edge of a downlink subband.

13. The apparatus of claim 12,
wherein the one or more processors are further configured to transmit configuration information associated with the RACH transmission repetition scheme, the configuration information indicative of the first quantity and the second quantity.

14. The apparatus of claim 13,
wherein the configuration information explicitly indicates the first quantity and the second quantity.

15. The apparatus of claim 12,
wherein the second quantity is based on a function of the first quantity.

16. The apparatus of claim 12,
wherein a first quantity of RACH occasions in the half-duplex slot is based on a function of a first quantity of uplink resources in the half-duplex slot and a second quantity of RACH occasions in the full-duplex slot is based on a function of a second quantity of uplink resources in the full-duplex slot.

17. The apparatus of claim 12,
wherein the second quantity is based on a set of resources associated with an uplink subband of the full-duplex slot.

18. The apparatus of claim 17,
wherein the one or more processors, to receive the second quantity of RACH transmissions, are configured to receive the second quantity of RACH transmissions in the uplink subband.

19. The apparatus of claim 12,
wherein the one or more processors, to receive the second quantity of RACH transmissions, are configured to:
receive, in an uplink subband, a first RACH transmission of the second quantity of RACH transmissions in a first valid RACH occasion, the first valid RACH occasion comprising a RACH occasion associated with a first frequency that corresponds to a first frequency gap between the first frequency and a downlink frequency associated with an adjacent downlink subband, wherein receiving the first RACH transmission comprises receiving the first RACH transmission prior to receiving a second RACH transmission of the second quantity of RACH transmissions based on the first frequency gap satisfying a minimum gap threshold; and
receive, in the uplink subband and subsequent to receiving the first RACH transmission, the second RACH transmission in a second valid RACH occasion, the second valid RACH occasion comprising a RACH occasion associated with a second frequency that corresponds to a second frequency gap between the second frequency and the downlink frequency, wherein the first frequency gap is wider than the second frequency gap.

20. The apparatus of claim 12,
wherein the one or more processors are further configured to transmit an indication of the maximum transmission power.

21. The apparatus of claim 20,
wherein the one or more processors, to transmit the indication, are configured to transmit at least one of a broadcast communication that includes the indication or a radio resource control message that includes the indication.

22. A method of wireless communication performed by a user equipment (UE), comprising:
transmitting, in a half-duplex slot and in accordance with a random access channel (RACH) transmission repetition scheme, a first quantity of RACH transmissions; and
transmitting, in accordance with the RACH transmission repetition scheme and in a full-duplex slot associated with a subband full-duplex (SBFD) configuration, a second quantity of RACH transmissions, the first quantity and the second quantity being based on a half-duplex slot type and a full-duplex slot type, respectively, wherein transmitting the second quantity of RACH transmissions comprises transmitting, in an uplink subband, a RACH transmission in a RACH occasion using a transmission power no greater than a maximum transmission power, based at least in part on the RACH occasion being adjacent to an edge of a downlink subband.

23. The method of claim 22, further comprising receiving configuration information associated with the RACH transmission repetition scheme, the configuration information indicative of the first quantity and the second quantity.

24. The method of claim 23, wherein the configuration information explicitly indicates the first quantity and the second quantity.

25. The method of claim 22, wherein the second quantity is based on a function of the first quantity.

26. A method of wireless communication performed by a network node, comprising:

receiving, in a half-duplex slot and in accordance with a random access channel (RACH) transmission repetition scheme, a first quantity of RACH transmissions; and receiving, in accordance with the RACH transmission repetition scheme and in a full- duplex slot associated with a subband full-duplex (SBFD) configuration, a second quantity of RACH transmissions, the first quantity and the second quantity being based on a half-duplex slot type and a full-duplex slot type, respectively, wherein receiving the second quantity of RACH transmissions comprises receiving, in an uplink subband, a RACH transmission in a RACH occasion, wherein the RACH transmission is transmitted using a transmission power no greater than a maximum transmission power, based at least in part on the RACH occasion being adjacent to an edge of a downlink subband.

27. The method of claim 26, further comprising transmitting configuration information associated with the RACH transmission repetition scheme, the configuration information indicative of the first quantity and the second quantity.

28. The method of claim 27, wherein the configuration information explicitly indicates the first quantity and the second quantity.

29. The method of claim 22, wherein a first quantity of RACH occasions in the half-duplex slot is based on a function of a first quantity of uplink resources in the half-duplex slot and a second quantity of RACH occasions in the full-duplex slot is based on a function of a second quantity of uplink resources in the full-duplex slot.

30. The method of claim 22, wherein the second quantity is based on a set of resources associated with an uplink subband of the full-duplex slot.

*    *    *    *    *